US008590296B2

(12) United States Patent
McBride et al.

(10) Patent No.: US 8,590,296 B2
(45) Date of Patent: *Nov. 26, 2013

(54) SYSTEMS AND METHODS FOR REDUCING DEAD VOLUME IN COMPRESSED-GAS ENERGY STORAGE SYSTEMS

(75) Inventors: Troy O. McBride, Norwich, VT (US);
Benjamin Bollinger, Windsor, VT (US);
John McCormick, Norwich, VT (US);
Benjamin Cameron, Hanover, NH (US)

(73) Assignee: SustainX, Inc., Seabrook, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/462,107

(22) Filed: May 2, 2012

(65) Prior Publication Data

US 2012/0210705 A1 Aug. 23, 2012

Related U.S. Application Data

(63) Continuation of application No. 13/080,914, filed on Apr. 6, 2011, now Pat. No. 8,191,362.

(60) Provisional application No. 61/322,115, filed on Apr. 8, 2010, provisional application No. 61/407,798, filed on Oct. 28, 2010, provisional application No. 61/412,959, filed on Nov. 12, 2010.

(51) Int. Cl.
*B60T 1/10* (2006.01)
*F02C 6/16* (2006.01)

(52) U.S. Cl.
USPC .............................................. 60/418; 60/410

(58) Field of Classification Search
USPC .................... 60/410, 413, 418, 459; 92/34
See application file for complete search history.

(56) References Cited

U.S. PATENT DOCUMENTS

| 4,094,356 | A | 6/1978 | Ash et al. |
| 4,194,889 | A | 3/1980 | Wanner |
| 4,195,481 | A | 4/1980 | Gregory |
| 4,452,047 | A | 6/1984 | Hunt et al. |
| 5,016,441 | A | 5/1991 | Pinto |
| 5,473,899 | A | 12/1995 | Viteri et al. |
| 5,595,587 | A | 1/1997 | Steed |
| 5,863,186 | A | 1/1999 | Green et al. |
| 6,453,659 | B1 | 9/2002 | Van Liere et al. |
| 6,484,498 | B1 | 11/2002 | Bonar, II |
| 6,554,088 | B2 | 4/2003 | Severinsky et al. |
| 7,127,887 | B2 | 10/2006 | Nakamura et al. |
| 7,527,482 | B2 | 5/2009 | Ursan et al. |
| 7,694,514 | B2 | 4/2010 | Smith et al. |
| 8,191,362 | B2 * | 6/2012 | McBride et al. ............. 60/418 |
| 8,225,606 | B2 | 7/2012 | McBride et al. |
| 8,234,862 | B2 | 8/2012 | McBride et al. |
| 8,234,863 | B2 | 8/2012 | McBride et al. |
| 8,234,868 | B2 | 8/2012 | Bollinger et al. |

(Continued)

FOREIGN PATENT DOCUMENTS

WO    WO 2008139267 A1 * 11/2008

OTHER PUBLICATIONS

Winterburn et al., "Mechanisms of Ultrasound Foam Interactions," Asia-Pac. J. Chem. Eng., vol. 4, pp. 184-190 (2009).

*Primary Examiner* — Thomas E Lazo
(74) *Attorney, Agent, or Firm* — Bingham McCutchen LLP

(57) ABSTRACT

In various embodiments, dead space and associated coupling losses are reduced in energy storage and recovery systems employing compressed air.

23 Claims, 18 Drawing Sheets

(56) References Cited

U.S. PATENT DOCUMENTS

| | | |
|---|---|---|
| 8,240,140 B2 | 8/2012 | McBride et al. |
| 8,240,146 B1 | 8/2012 | Bollinger |
| 8,245,508 B2 | 8/2012 | Bollinger et al. |
| 8,250,863 B2 | 8/2012 | Bollinger et al. |
| 8,272,212 B2 | 9/2012 | Blieske |
| 8,359,856 B2 | 1/2013 | McBride et al. |
| 8,448,433 B2 | 5/2013 | McBride et al. |
| 2006/0218924 A1 | 10/2006 | Mitani |
| 2010/0257862 A1 | 10/2010 | Howes et al. |
| 2011/0219760 A1 | 9/2011 | Mcbride et al. |
| 2011/0259001 A1 | 10/2011 | McBride et al. |
| 2011/0266810 A1 | 11/2011 | McBride et al. |
| 2011/0314810 A1 | 12/2011 | McBride et al. |
| 2012/0118137 A1 | 5/2012 | Fong et al. |
| 2012/0119513 A1 | 5/2012 | McBride et al. |
| 2012/0119514 A1 | 5/2012 | Crane et al. |
| 2012/0137668 A1 | 6/2012 | McBride et al. |
| 2012/0174569 A1 | 7/2012 | Ingersoll et al. |
| 2012/0197683 A1 | 8/2012 | Marcus |
| 2012/0222424 A1 | 9/2012 | Ingersoll et al. |
| 2012/0255292 A1 | 10/2012 | Fong et al. |
| 2012/0260645 A1 | 10/2012 | Fong et al. |
| 2012/0269651 A1 | 10/2012 | Fong et al. |
| 2012/0279209 A1 | 11/2012 | McBride et al. |
| 2012/0285154 A1 | 11/2012 | Bollinger et al. |
| 2012/0286522 A1 | 11/2012 | Stahlkopf et al. |
| 2012/0291989 A1 | 11/2012 | Fong et al. |
| 2012/0297772 A1 | 11/2012 | McBride et al. |
| 2012/0297776 A1 | 11/2012 | Bollinger et al. |
| 2012/0299310 A1 | 11/2012 | McBride et al. |
| 2013/0001958 A1 | 1/2013 | Crane et al. |
| 2013/0009408 A1 | 1/2013 | Crane et al. |
| 2013/0032743 A1 | 2/2013 | Fong et al. |
| 2013/0047597 A1 | 2/2013 | Fong et al. |
| 2013/0074485 A1 | 3/2013 | McBride et al. |
| 2013/0074488 A1 | 3/2013 | McBride et al. |
| 2013/0074940 A1 | 3/2013 | McBride et al. |
| 2013/0074941 A1 | 3/2013 | McBride et al. |
| 2013/0074949 A1 | 3/2013 | McBride et al. |
| 2013/0091834 A1 | 4/2013 | McBride et al. |
| 2013/0091835 A1 | 4/2013 | McBride et al. |
| 2013/0091836 A1 | 4/2013 | McBride et al. |
| 2013/0098027 A1 | 4/2013 | Le Roux et al. |
| 2013/0104533 A1 | 5/2013 | Fong et al. |
| 2013/0108480 A1 | 5/2013 | Fong et al. |
| 2013/0111895 A1 | 5/2013 | Fong et al. |
| 2013/0126014 A1 | 5/2013 | Fong et al. |
| 2013/0139500 A1 | 6/2013 | McBride et al. |
| 2013/0145764 A1 | 6/2013 | McBride et al. |

* cited by examiner

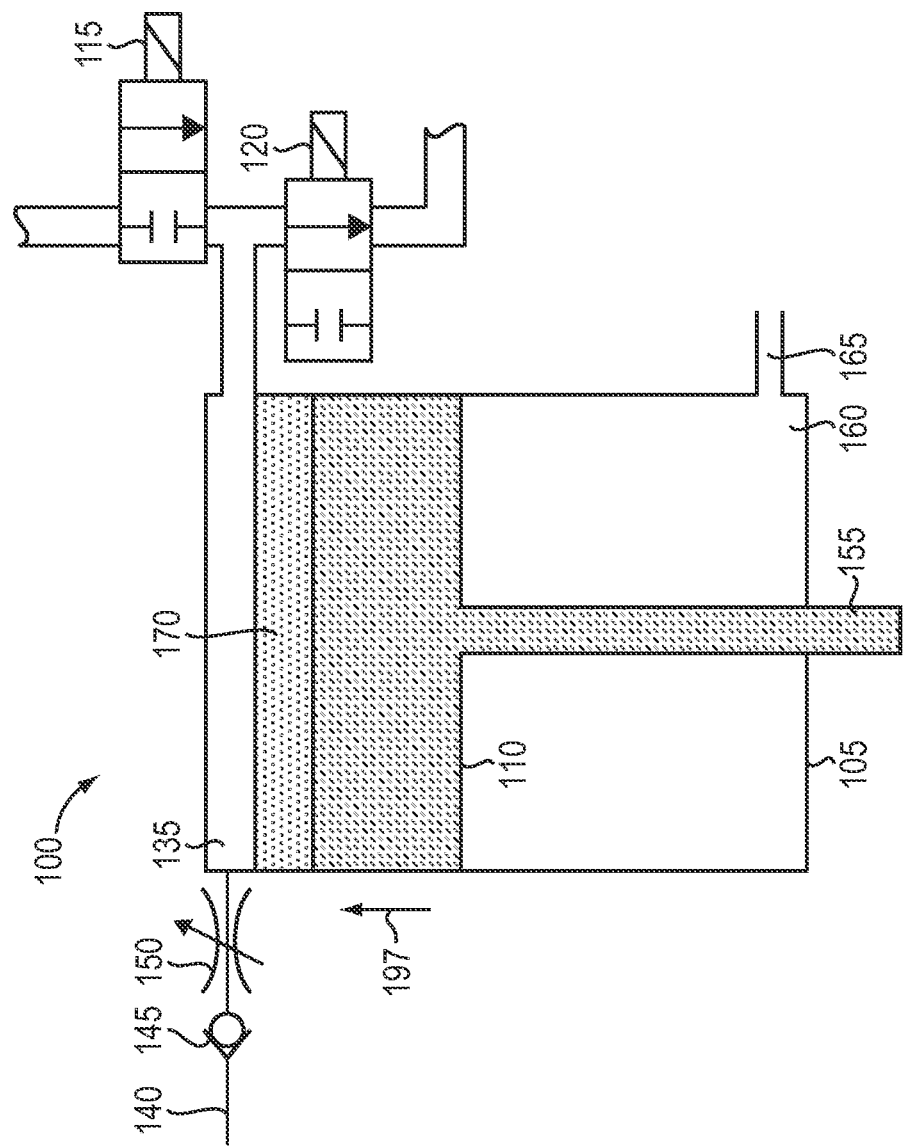

SYSTEMS AND METHODS FOR REDUCING DEAD VOLUME IN COMPRESSED-GAS ENERGY STORAGE SYSTEMS

RELATED APPLICATIONS

This application is a continuation of U.S. patent application Ser. No. 13/080,914, filed on Apr. 6, 2011, which claims the benefit of and priority to U.S. Provisional Patent Application No. 61/322,115, filed Apr. 8, 2010; U.S. Provisional Patent Application No. 61/407,798, filed Oct. 28, 2010; and U.S. Provisional Patent Application No. 61/412,959, filed Nov. 12, 2010. The entire disclosure of each of these applications is hereby incorporated herein by reference.

STATEMENT REGARDING FEDERALLY SPONSORED RESEARCH

This invention was made with government support under IIP-0810590 and IIP-0923633 awarded by the NSF. The government has certain rights in the invention.

FIELD OF THE INVENTION

In various embodiments, the present invention relates to pneumatics, power generation, and energy storage, and more particularly, to compressed-gas energy-storage systems and methods using pneumatic or pneumatic/hydraulic cylinders.

BACKGROUND

Storing energy in the form of compressed gas has a long history and components tend to be well tested and reliable, and have long lifetimes. The general principle of compressed-gas or compressed-air energy storage (CAES) is that generated energy (e.g., electric energy) is used to compress gas (e.g., air), thus converting the original energy to pressure potential energy; this potential energy is later recovered in a useful form (e.g., converted back to electricity) via gas expansion coupled to an appropriate mechanism. Advantages of compressed-gas energy storage include low specific-energy costs, long lifetime, low maintenance, reasonable energy density, and good reliability.

If a body of gas is at the same temperature as its environment, and expansion occurs slowly relative to the rate of heat exchange between the gas and its environment, then the gas will remain at approximately constant temperature as it expands. This process is termed "isothermal" expansion. Isothermal expansion of a quantity of high-pressure gas stored at a given temperature recovers approximately three times more work than would "adiabatic expansion," that is, expansion where no heat is exchanged between the gas and its environment—e.g., because the expansion happens rapidly or in an insulated chamber. Gas may also be compressed isothermally or adiabatically.

An ideally isothermal energy-storage cycle of compression, storage, and expansion would have 100% thermodynamic efficiency. An ideally adiabatic energy-storage cycle would also have 100% thermodynamic efficiency, but there are many practical disadvantages to the adiabatic approach. These include the production of higher temperature and pressure extremes within the system, heat loss during the storage period, and inability to exploit environmental (e.g., cogenerative) heat sources and sinks during expansion and compression, respectively. In an isothermal system, the cost of adding a heat-exchange system is traded against resolving the difficulties of the adiabatic approach. In either case, mechanical energy from expanding gas must usually be converted to electrical energy before use.

An efficient and novel design for storing energy in the form of compressed gas utilizing near isothermal gas compression and expansion has been shown and described in U.S. patent application Ser. No. 12/421,057 (the '057 application) and Ser. No. 12/639,703 (the '703 application), the disclosures of which are hereby incorporated herein by reference in their entireties. The '057 and '703 applications disclose systems and methods for expanding gas isothermally in staged cylinders and intensifiers over a large pressure range in order to generate electrical energy when required. Mechanical energy from the expanding gas may be used to drive a hydraulic pump/motor subsystem that produces electricity. Systems and methods for hydraulic-pneumatic pressure intensification that may be employed in systems and methods such as those disclosed in the '057 and '703 applications are shown and described in U.S. patent application Ser. No. 12/879,595 (the '595 application), the disclosure of which is hereby incorporated herein by reference in its entirety.

In the systems disclosed in the '057 and '703 applications, reciprocal mechanical motion is produced during recovery of energy from storage by expansion of gas in the cylinders. This reciprocal motion may be converted to electricity by a variety of means, for example as disclosed in the '595 application as well as in U.S. patent application Ser. No. 12/938,853 (the '853 application), the disclosure of which is hereby incorporated herein by reference in its entirety. The ability of such systems to either store energy (i.e., use energy to compress gas into a storage reservoir) or produce energy (i.e., expand gas from a storage reservoir to release energy) will be apparent to any person reasonably familiar with the principles of electrical and pneumatic machines.

In order to reduce overall pressure ranges of operation, CAES systems may utilize designs involving multiple interconnected cylinders. Unfortunately, this often results in trapped volumes of "dead space" at lower pressure than the gas. Such volumes may occur in the cylinders themselves and/or in the conduits interconnecting the cylinders, and may diminish the pressure of the gas in the system, thus reducing the amount of work recovered from or stored within the gas.

Air dead space tends to reduce the amount of work available from a quantity of high-pressure gas brought into communication with the dead space. This loss of potential energy may be termed a coupling loss. For example, if gas is to be introduced into a cylinder through a valve for the purpose of performing work by pushing against a piston within the cylinder, and a chamber or volume exists adjacent the piston that is filled with low-pressure gas at the time the valve is opened, the high-pressure gas entering the chamber is immediately reduced in pressure during free expansion and mixing with the low-pressure gas and, therefore, performs less mechanical work upon the piston. The low-pressure volume in such an example constitutes air dead space. Dead space may also appear within that portion of a valve mechanism that communicates with the cylinder interior, or within a tube or line connecting a valve to the cylinder interior. Energy losses due to pneumatically communicating dead spaces tend to be additive.

Moreover, in an expander-compressor system operated to expand or compress gas near-isothermally (at approximately constant temperature) within a cylinder, gas that escapes the cylinder to become dead space in a hydraulic subsystem may, as pressures change within the system, expand and compress adiabatically (at non-constant temperature), with associated energy losses due to heat transfer between the dead space and materials surrounding the dead space. Therefore, in various compressor-expander systems, including isothermal compressor-expander systems, preventing the formation of dead space will generally enable higher system efficiency.

Attempts to minimize such dead space frequently involve reducing the sizes and lengths of the conduits interconnecting the cylinders, but such efforts may not eliminate all dead space and, in any case, necessarily limit the overall geometry and placement of the individual system components.

SUMMARY

Embodiments of the present invention substantially reduce or eliminate air dead space within an energy storage and retrieval system employing compressed gas. Herein, the terms "air dead space" or "dead space" refer to any volume within the components of a CAES and recovery system— including but not restricted to lines, storage vessels, cylinders, and valves—that at some point in the operation of the system is filled with gas at a pressure significantly lower (e.g., lower by approximately a factor of 10, or even more) than other gas which is about to be introduced into that volume for the purpose of doing work (e.g., expansion of the gas). Dead space may also include portions of gas at high pressure that are "trapped" in the system (e.g., in a cylinder after compression) and not exhausted to a different system component when the larger portion of the gas is exhausted (e.g., to a reservoir or to a different cylinder). At other points in system operation, the same physical volume within a given device may not constitute dead space. Dead space also includes pockets of air or other gas within hydraulic systems, e.g., heat-transfer subsystems, which, as described above, may lead to energy losses.

There are at least two approaches to reducing dead space. One is to shape components such as valves, cylinders, pistons, and the like so as to minimize dead space. In the example above, dead space within the cylinder could be greatly reduced or eliminated by shaping the piston to fit perfectly against the interior surface of the cylinder. However, it may be impractical or expensive to reduce dead space to economically insignificant levels in a compressed-air energy storage-and-recovery system by customizing parts.

A second approach to reducing air dead space, described and utilized herein in various embodiments, fills dead volumes with an incompressible (or mostly incompressible) fluid, such as water, rather than with gas. For example, dead space may be minimized by filling connecting valve space, cylinder head space, and connecting hoses with liquid (e.g., water) in a compressed-air energy storage-and-retrieval system throughout an expansion and compression process. Liquid may be introduced into dead spaces and removed as needed without hampering the operation of the system.

Embodiments of the invention also increase the efficiency of a pneumatic compressor-expander cylinder through which a heat-exchange liquid is circulated. Various embodiments prevent the movement of gas from the interior of the pneumatic compressor-expander cylinder into the otherwise liquid-filled pipes and other devices conveying heat-exchange liquid to the cylinder. Bubbles or other bodies of gas within the otherwise liquid-filled pipes and other devices conveying heat-exchange liquid to the cylinder tend to reduce compression-expansion efficiency. Preventing the formation of such bodies of gas therefore increases efficiency.

Dead space may be formed by the movement of bubbles or bodies of gas into bodies of liquid. Consider, for example, a vertically oriented pneumatic cylinder that is divided into two chambers (e.g., by a piston slidably disposed therein) and into which heat-exchange liquid may be introduced through orifices at the upper end of at least one of the cylinder's two chambers. When droplets of heat-exchange liquid are injected into either chamber, they are drawn downward by gravity. Gas, typically being less dense and therefore more buoyant than the heat-exchange liquid, may pass through the heat-exchange liquid orifices into the spray head, spray rod, hoses, tubes, or other components conveying the heat-exchange liquid. In the case of a spray head located at the top of a cylinder chamber, gas introduced into the cylinder chambers during operation may flow up through the spray head and into other hydraulic (liquid-filled) components such as rods and hoses. This may lead to pockets of gas (dead space) at local high points in the rods and hoses. This dead space will typically expand or compress nearly adiabatically as the pressure of the surrounding heat-exchange liquid changes, negatively affecting isothermal efficiency. In addition or alternatively, gas may move from a cylinder chamber into rods, hoses, and hydraulic components if the pressure in the hydraulic components dips below that in gas-filled cylinder chambers with which the hydraulic components communicate.

Embodiments of the invention prevent the formation of dead space in compressor-expander systems by preventing movement of gas from the interior of a compressor-expander cylinder into any part of the hydraulic circuit that injects heat-exchange liquid into the interior of the pneumatic cylinder (or pneumatic chamber of a cylinder). For example, in a vertically oriented pneumatic cylinder into which heat-exchange liquid is introduced through one or more orifices located at or near the upper end of a chamber, check valves may be installed on the liquid (upstream) side of each orifice to prevent flow of gas into hydraulic components. As used herein, the term "check valve" is a valve that allows flow of fluid in one direction while substantially or completely blocking flow in the other direction. Similarly, in an arbitrarily oriented pneumatic cylinder into which heat-exchange liquid is introduced through one or more orifices in a spray rod oriented parallel to the axis of the pneumatic cylinder, check valves may be installed on the liquid (upstream) side of each orifice in the spray rod to prevent flow of gas into hydraulic components. The "cracking pressure" of a check valve is the minimum upstream pressure at which the valve will operate. Typically the check valve is designed to operate based on a specific cracking pressure.

Various embodiments feature, in a vertically oriented pneumatic cylinder into which heat-exchange liquid is introduced through one or more orifices in a spray head located at or near the upper end of a chamber, and in which heat-exchange liquid is fed into the spray head through one or more pipes, a single check valve installed in each pipe feeding the spray head on the upstream side of the connection between the pipe and spray head to prevent flow of gas into hydraulic components. Similarly, in an arbitrarily oriented pneumatic cylinder into which heat-exchange liquid is introduced through one or more orifices in a spray rod fed by one or more pipes and oriented parallel to the axis of the pneumatic cylinder, a single check valve may be installed in each pipe feeding the spray rod on the upstream side of the connection between the pipe and spray rod to prevent flow of gas into hydraulic components. Furthermore, in an arbitrarily oriented pneumatic cylinder into which heat-exchange liquid is introduced through one or more orifices located anywhere on the interior surfaces of the chambers of the cylinder, check valves may be installed on the upstream side of each orifice to prevent flow of gas into hydraulic components.

Embodiments of the invention also increase the efficiency of a CAES system that uses two or more connected (e.g., series-connected) pneumatic or hydraulic/pneumatic cylinders to interconvert mechanical work and the elastic potential energy of a gas. In various embodiments, a reservoir of pressurized gas is placed in fluid communication with the valves and pipes that connect any two connected cylinders in such a system. The reservoir of pressurized gas enables (1) reduction or elimination of dead space in piping and valves connecting the two connected cylinders and (2) the operation of the two cylinders with an arbitrary phase difference, rather than a fixed 180° phase difference. The first benefit (i.e., reduction or elimination of dead space) increases system efficiency directly (as described above) and also enables series-connected cylinders to be located at arbitrary distances from each other without loss of efficiency; the second benefit (i.e., operation with arbitrary phase difference) allows series-connected cylinders to be at arbitrary phases with respect to one another when linked to a common crankshaft or other mechanical load.

Two cylinders are herein said to be "series-connected" when they are connected by valves and piping that place the higher-pressure chamber of one of the cylinders in selective fluid communication with the lower-pressure chamber of the other cylinder. Also, when a piston slidably disposed within a cylinder undertakes a repeatable cycle of motion (e.g., moves back and forth between the ends of the cylinder), the position of the piston relative to that cycle of motion is herein termed the "phase" of both the piston and the cylinder. Two cylinders are herein said to be "in phase" when their respective pistons undertake repeatable cycles of motion of equal duration (period) and occupy comparable points in those cycles: e.g., if when one piston is at the distal end its cylinder and just starting to move toward the other end, the other piston is also at the distal end of its cylinder and starting to move toward the other end, the two cylinders are in phase. If two pistons having motion cycles of equal duration occupy different points in those cycles, the fixed fraction of a cycle separating the two pistons is herein expressed as an angle, where the duration of a complete cycle corresponds to 360°.

Embodiments of the present invention relate to an energy storage and generation system utilizing compressed gas. In a CAES system, gas is stored at high pressure (e.g., approximately 3,000 psi). This gas may be expanded into a cylinder having a first compartment (or "chamber") and a second compartment separated by a piston slidably disposed within the cylinder, a shaft coupled to the piston and extending through at least one of the first compartment and the second compartment of the cylinder and beyond an end cap of the cylinder, and a transmission mechanism coupled to the shaft for converting a reciprocal motion of the shaft into a rotary motion, as described in the '595 and '853 applications. Moreover, a motor/generator may be coupled to the transmission mechanism. Alternatively or additionally, the shaft of the cylinders may be coupled to one or more linear generators, as described in the '853 application.

Also as described in the '853 application, the range of forces produced by expanding a given quantity of gas in a given time may be reduced through the addition of multiple, series-connected cylinder stages. That is, as gas from a high-pressure reservoir is expanded in one chamber of a first, high-pressure cylinder, gas from the other chamber of the first cylinder is directed to the expansion chamber of a second, lower-pressure cylinder. Gas from the lower-pressure chamber of this second cylinder may either be vented to the environment or directed to the expansion chamber of a third cylinder operating at still lower pressure; the third cylinder may be similarly connected to a fourth cylinder; and so on.

The principle may be extended to two or more cylinders to suit particular applications. For example, a narrower output force range for a given range of reservoir pressures is achieved by having a first, high-pressure cylinder operating between approximately 3,000 psig and approximately 300 psig and a second, larger-volume, lower-pressure cylinder operating between approximately 300 psig and approximately 30 psig. When two expansion cylinders are used, the range of pressure within either cylinder (and thus the range of force produced by either cylinder) is reduced as the square root relative to the range of pressure (or force) experienced with a single expansion cylinder, e.g., from approximately 100:1 to approximately 10:1 (as set forth in the '853 application). Furthermore, as set forth in the '595 application, N appropriately sized cylinders can reduce an original operating pressure range R to $R^{1/N}$. Any group of N cylinders staged in this manner, where N≥2, is herein termed a cylinder group.

From the foregoing example it will be apparent that in an N-cylinder group used for expansion or compression of gas between a high pressure (e.g., approximately 3,000 psig) and a low pressure (e.g., approximately 30 psig), the system will contain gas at N−1 pressures intermediate between the high-pressure extreme and the low pressure. Herein each such intermediate pressure may be termed a "mid-pressure." in the foregoing example, N=2 and N−1=1, so there is one mid-pressure (i.e., approximately 300 psig) in the system. In various states of operation of the system, mid-pressures may occur in any of the chambers of a series-connected cylinder group and within any valves, piping, and other devices in fluid communication with those chambers. The above pressure values are merely exemplary, as the invention encompasses wide ranges of high and low pressures, as well as different mid-pressures between the high and low pressures. For example, the low pressure may be approximately atmospheric and a suitable mid-pressure may be approximately 250 psig.

In an exemplary two-cylinder group connected in accordance with prior art, a first (higher-pressure) cylinder and a second (lower-pressure) cylinder are connected by valves, piping, and possibly other devices. During a typical sequence of states of operation, e.g., during expansion of high-pressure (e.g., approximately 3,000 psig) gas from a storage reservoir down to near atmospheric pressure (e.g., approximately 0 psig), high-pressure gas is admitted into a chamber of the first cylinder. The gas in the chamber expands, pushing the first cylinder's slidable piston toward the distal end of the cylinder. When the gas in the chamber has expanded sufficiently, it will be at a mid-pressure (e.g., approximately 250 psig). Valves may then be operated to allow the mid-pressure gas in the first cylinder to flow into a chamber of the second cylinder that has previously been vented to atmospheric pressure. The mid-pressure gas in the chamber of the second cylinder then expands, pushing the second cylinder's slidable piston toward the distal end of the second cylinder. In this sequence of states of operation, when valves are operated to allow the mid-pressure gas in the first cylinder to flow into a chamber of the second cylinder, gas at mid-pressure flows into potential dead space (volume potentially occupied in part or whole by lower-pressure (e.g., atmospheric-pressure) gas) in piping, valves, and possibly other devices connecting the expansion chamber of the first cylinder to the expansion chamber of the second cylinder.

Embodiments of the invention maintain an approximately constant gas pressure within the piping, valves, chambers, and other components through or into which gas at a mid-pressure passes during various states of operation of a cylinder group used to expand or compress gas. In volumes where the invention maintains an approximately constant mid-pressure, interconnecting dead space is reduced or eliminated. Embodiments of the invention also allow the two or more cylinders within a cylinder group to operate in arbitrary phases with respect to one another.

Embodiments of the invention involve at least three approaches to maintaining approximately constant mid-pressures in portions of energy storage and recovery systems employing groups of series-connected expander-compressor cylinders. First, in a system employing two series-connected cylinders for the expansion or compression of gas, in which gas at a mid-pressure is transferred from one cylinder to another in some states of operation, a reservoir of gas is placed in fluid communication with the valves, piping, chambers, and other components through or into which the mid-pressure gas passes. The gas in the reservoir is at approximately the mid-pressure. The reservoir is large enough so that a volume of mid-pressure gas approximately equal to that within the valves, piping, chambers, and other components with which the reservoir is in fluid communication can enter or leave the reservoir without substantially changing its pressure.

Second, in a system employing a group of three or more series-connected cylinders for the expansion or compression of gas, where in some states of operation gas is transferred from the first cylinder to the second at one mid-pressure, from the second to the third at a second (lower) mid-pressure, and so on, a separate reservoir of gas is placed in fluid communication with the valves, piping, chambers, and other components through or into which the gas at each mid-pressure passes. The gas in each of the reservoirs is at a different appropriate mid-pressure. Each reservoir is large enough so that a volume of mid-pressure gas approximately equal to that within the valves, piping, chambers, and other components with which the reservoir is in fluid communication can enter or leave the reservoir without substantially changing its pressure.

Third, in a system employing two or more similar groups of series-connected cylinders for the expansion or compression of gas, where in some states of operation gas is transferred from the first cylinder in each group to the second cylinder in each group at one mid-pressure, from the second to the third at a second (lower) mid-pressure, and so on, a separate reservoir of gas is placed in fluid communication with the valves, piping, chambers, and other components through or into which the gas at each mid-pressure passes in all of the cylinder groups. Each reservoir thus serves to maintain an approximately constant mid-pressure in one or more of the components of each of multiple cylinder groups.

All of the approaches described above for converting potential energy in compressed gas into mechanical and electrical energy may, if appropriately designed, be operated in reverse to store electrical energy as potential energy in a compressed gas. Since the accuracy of this statement will be apparent to any person reasonably familiar with the principles of electrical machines, power electronics, pneumatics, and the principles of thermodynamics, the operation of these mechanisms to both store energy and recover it from storage will not be described for each embodiment. Such operation is, however, contemplated and within the scope of the invention and may be straightforwardly realized without undue experimentation.

Any implementation of this invention may be co-implemented with any of the integrated heat-transfer systems and methods described in the '703 application and/or with the external heat-transfer systems and methods described in the '426 patent.

The compressed-air energy storage and recovery systems described herein are preferably "open-air" systems, i.e., systems that take in air from the ambient atmosphere for compression and vent air back to the ambient atmosphere after expansion, rather than systems that compress and expand a captured volume of gas in a sealed container (i.e., "closed-air" systems). Thus, the systems described herein generally feature one or more cylinder assemblies for the storage and recovery of energy via compression and expansion of gas. Selectively fluidly connected to the cylinder assembly are (i) means for storage of compressed gas after compression and supply of compressed gas for expansion thereof, and (ii) a vent for exhausting expanded gas to atmosphere after expansion and supply of gas for compression. The means for storage of compressed gas may include or consist essentially of, e.g., one or more pressure vessels or naturally occurring formations such as caverns or other large cavities. Open-air systems typically provide superior energy density relative to closed-air systems.

Furthermore, the systems described herein may be advantageously utilized to harness and recover sources of renewable energy, e.g., wind and solar energy. For example, energy stored during compression of the gas may originate from an intermittent renewable energy source of, e.g., wind or solar energy, and energy may be recovered via expansion of the gas when the intermittent renewable energy source is nonfunctional (i.e., either not producing harnessable energy or producing energy at lower-than-nominal levels). As such, the systems described herein may be connected to, e.g., solar panels or wind turbines, in order to store the renewable energy generated by such systems.

In addition, energy storage and generation systems in accordance with embodiments of the invention may include a heat-transfer subsystem for expediting heat transfer in one or more compartments (or "chambers") of the cylinder assembly. In one embodiment, the heat-transfer subsystem includes a fluid circulator and a heat-transfer fluid reservoir as described in the '703 application. The fluid circulator pumps a heat-transfer fluid into the first compartment and/or the second compartment of the pneumatic cylinder. The heat-transfer subsystem may also include a mechanism, disposed in the first compartment and/or the second compartment, for introducing the heat-transfer fluid. In various embodiments, the spray mechanism is a spray head and/or a spray rod.

Gas undergoing expansion tends to cool, while gas undergoing compression tends to heat. To maximize efficiency (i.e., the fraction of elastic potential energy in the compressed gas that is converted to work, or vice versa), gas expansion and compression should be as near isothermal (i.e., constant-temperature) as possible. Several ways of approximating isothermal expansion and compression may be employed.

First, as described in the '703 application, droplets of a liquid (e.g., water) may be sprayed into a chamber of the cylinder in which gas is presently undergoing compression (or expansion) in order to transfer heat to or from the gas. As the liquid droplets exchange heat with the gas around them, the temperature of the gas is raised or lowered; the temperature of the droplets is also raised or lowered. The liquid is evacuated from the cylinder through a suitable mechanism. The heat-exchange spray droplets may be introduced through a spray head (in, e.g., a vertical cylinder), through a spray rod arranged coaxially with the cylinder piston (in, e.g., a horizontal cylinder), or by any other mechanism that permits formation of a liquid spay within the cylinder. Droplets may be used to either warm gas undergoing expansion or to cool gas undergoing compression. An isothermal process may be approximated via judicious selection of this heat-exchange rate.

Furthermore, as described in U.S. Pat. No. 7,802,426 (the '426 patent), the disclosure of which is hereby incorporated by reference herein in its entirety, gas undergoing either compression or expansion may be directed, continuously or in installments, through a heat-exchange subsystem external to the cylinder. The heat-exchange subsystem either rejects heat to the environment (to cool gas undergoing compression) or absorbs heat from the environment (to warm gas undergoing expansion). Again, an isothermal process may be approximated via judicious selection of this heat-exchange rate.

In one aspect, embodiments of the invention feature an energy storage and recovery system including or consisting essentially of a cylinder assembly for compressing gas to store energy and expanding gas to recover energy, a first mechanism, and a second mechanism. The cylinder assembly includes or consists essentially of first and second chambers (at least one of which is a pneumatic chamber) and a movable mechanical boundary mechanism separating the first and second chambers. The cylinder assembly includes dead space when the boundary mechanism is disposed at a limit of travel within the cylinder assembly. The first mechanism removably introduces a substantially incompressible fluid (e.g., a liquid such as water) into a pneumatic chamber (i.e., the first chamber and/or the second chamber) to substantially fill the dead space prior to or during gas compression or expansion. The second mechanism introduces a gas into the pneumatic chamber and removes the gas and at least a portion of the substantially incompressible fluid from the pneumatic chamber.

Embodiments of the invention include one or more of the following, in any of a variety of combinations. A compressed-gas reservoir (e.g., one or more pressure vessels and/or one or more naturally occurring formations such as caverns) for storage of gas after compression and supply of compressed gas for expansion thereof may be selectively fluidly connected to the second mechanism. A vent for exhausting expanded gas to atmosphere and supply of gas for compression thereof may be selectively connected to the second mechanism. An intermittent renewable energy source of, e.g., wind or solar energy, may be connected to the cylinder assembly. Energy stored during compression of the gas may originate from the intermittent renewable energy source, and energy may be recovered via expansion of the gas when the intermittent renewable energy source is nonfunctional. The system may include a heat-transfer subsystem in fluid communication with the pneumatic chamber for enabling substantially isothermal expansion and compression of gas, thereby increasing efficiency of the energy recovery and storage. The heat-transfer subsystem may include a circulation apparatus for circulating a heat-transfer fluid through the pneumatic chamber. The heat-transfer subsystem may include a mechanism (e.g., a spray head and/or a spray rod) disposed within the pneumatic chamber for introducing the heat-transfer fluid. The heat-transfer subsystem may include a heat exchanger and a circulation apparatus for circulating gas from the pneumatic chamber through the heat exchanger and back to the pneumatic chamber.

The first mechanism may include or consist essentially of a check valve for allowing flow of the substantially incompressible fluid in only one direction and a flow control valve for metering the rate of introduction of the substantially incompressible fluid. The system may include a sensor for measuring the flow rate and/or the pressure of the substantially incompressible fluid, as well as a controller for controlling the flow control valve based on data from the sensor.

The second mechanism may include or consist essentially of a first shut-off valve for controlling the introduction of the gas into the pneumatic chamber and a second shut-off valve for controlling the removal of the substantially incompressible fluid and the gas from the pneumatic chamber. The first chamber may be a pneumatic chamber, and the second chamber may be a hydraulic chamber, or both chambers may be pneumatic chambers. The system may include a crankshaft, mechanically coupled to the boundary mechanism, for converting reciprocal motion of the boundary mechanism into rotary motion. A motor/generator may be coupled to the crankshaft.

The system may include (i) a second cylinder assembly that includes or consists essentially of first and second chambers (at least one of which is a pneumatic chamber) and a movable mechanical boundary mechanism separating the first and second chambers, and (ii) a conduit for fluidly connecting the pneumatic chamber of the cylinder assembly with a pneumatic chamber of the second cylinder assembly. At least a portion of the conduit may constitute dead space during compression or expansion of gas in the cylinder assembly and the second cylinder assembly. The second mechanism may be configured to direct gas from the pneumatic chamber of the cylinder assembly to the pneumatic chamber of the second cylinder assembly. The system may include a third mechanism for introducing substantially incompressible fluid into the conduit to substantially fill the dead space in the conduit. The first mechanism and the third mechanism may be the same, or the third mechanism may be different from the first mechanism.

In another aspect, embodiments of the invention feature a method for reducing dead space in an energy storage and recovery system. Substantially incompressible fluid is introduced into a cylinder assembly to substantially fill the dead space formed in the cylinder assembly during compression or expansion of gas therein. Gas is compressed to store energy and/or expanded to recover energy within the cylinder assembly while the substantially incompressible fluid is substantially filling the dead space in the cylinder assembly.

Embodiments of the invention may include one or more of the following, in any of a variety of combinations. Expanded gas may be vented to atmosphere, and/or compressed gas may be stored in a compressed-gas reservoir. Energy stored during compression of the gas may originate from an intermittent renewable energy source of, e.g., wind or solar energy, and energy may be recovered via expansion of the gas when the intermittent renewable energy source is nonfunctional. Heat may be exchanged with the gas during the expansion and/or compression in order to maintain the gas at a substantially constant temperature, thereby increasing efficiency of the energy recovery and storage. Gas and at least a portion of the substantially incompressible fluid may be removed from the cylinder assembly. Gas may be transferred from the cylinder assembly to a second cylinder assembly for compression and/or expansion therein over a pressure range different from the pressure range of compressing and/or expanding gas within the cylinder assembly. Dead space between the cylinder assembly and the second cylinder assembly (e.g., within a conduit connecting them) may be substantially filled with a substantially incompressible fluid.

In yet another aspect, embodiments of the invention feature an energy storage and recovery system including or consisting essentially of a first cylinder assembly, a second cylinder assembly, a connector, and a compressed-gas reservoir. The first cylinder assembly includes or consists essentially of first and second separated compartments for, over a first range of pressures, compression of gas to store energy and/or expansion of gas to recover energy. The second cylinder assembly includes or consists essentially of first and second separated compartments for compression and/or expansion of gas over a second range of pressures (i) different from the first range of pressures and (ii) overlapping the first range at an intermediate pressure. The connector selectively fluidly connects the first compartments of the first and second cylinder assemblies. The compressed-gas reservoir is fluidly connected to the connector and maintains the connector at the intermediate pressure.

Embodiments of the invention include one or more of the following, in any of a variety of combinations. The first and second cylinder assemblies may be coupled in series pneumatically. The reservoir may have a volume sufficient to supply gas to the entire volume of the connector while maintaining a substantially constant pressure within the reservoir. The reservoir may have a volume sufficient to supply gas to the entire volume of the first compartment(s) of the first and/or second cylinder assemblies while maintaining a substantially constant pressure within the reservoir. The reservoir may include or consist essentially of a pressure-compensated vessel. The first and/or second cylinder assembly may include a movable boundary mechanism separating the first and second compartments. A crankshaft may be coupled to each of the movable mechanical boundary mechanisms via a throw. The angle between the throws may be substantially different from 180°.

The system may include a heat-transfer system for introducing, within at least one of the compartments of the first and/or second cylinder assemblies, heat-transfer fluid for exchanging heat with gas, thereby increasing efficiency of the energy storage and recovery. The heat-transfer system may include a spray head and/or a spray rod. The system may include a heat exchanger and a circulation apparatus for circulating the heat-transfer fluid between the heat exchanger and the first and/or second cylinder assembly. Each of the first or second cylinder assemblies may include or consist essentially of a pneumatic cylinder or a pneumatic/hydraulic cylinder. A second compressed-gas reservoir (which may be different from the compressed-gas reservoir), for storage of gas after compression and supply of compressed gas for expansion thereof, may be selectively fluidly connected to the first and/or second cylinder assembly. A vent for exhausting expanded gas to atmosphere and supply of gas for compression thereof may be selectively fluidly connected to the first and/or second cylinder assembly. An intermittent renewable energy source of, e.g., wind or solar energy, may be connected to the first and/or second cylinder assembly. Energy stored during compression of the gas may originate from the intermittent renewable energy source, and energy may be recovered via expansion of the gas when the intermittent renewable energy source is nonfunctional.

In an additional aspect, embodiments of the invention feature an energy storage and recovery system including or consisting essentially of a plurality of independently operative cylinder groups for compression of gas to store energy and/or expansion of gas to recover energy, as well as a compressed-gas reservoir. Each cylinder group includes or consists essentially of a plurality of cylinder assemblies and a connector selectively fluidly connecting the cylinder assemblies. The compressed-gas reservoir is fluidly connected to each connector and maintains each connector at an intermediate pressure (e.g., an intermediate pressure of compression and/or expansion of gas within the cylinder assemblies; at least two, or even each, of the cylinder assemblies typically operate(s) over a different range of pressures, and the different pressure ranges overlap at the intermediate pressure).

Embodiments of the invention may include one or more of the following, in any of a variety of combinations. The reservoir may have a volume sufficient to supply gas to the entire volume of each connector while maintaining a substantially constant pressure within the reservoir. Each cylinder group may include or consist essentially of a first cylinder assembly (including or consisting essentially of first and second separated compartments) for compression and/or expansion of gas over a first range of pressures, and a second cylinder assembly (including or consisting essentially of first and second separated compartments) for compression and/or expansion of gas over a second range of pressures. The second range of pressures may be different from the first range of pressures and may overlap the first range at the intermediate pressure. The reservoir may have a volume sufficient to supply gas, for each cylinder group, to an entire volume of the first compartment of the first and/or second cylinder assemblies while maintaining a substantially constant pressure within the reservoir.

In another aspect, embodiments of the invention feature a method of energy storage and recovery including or consisting essentially of compressing gas to store energy and/or expanding gas to recover energy within a plurality of series-connected cylinder assemblies each operating over a different pressure range, and maintaining a connection between at least two cylinder assemblies at a substantially constant intermediate pressure within the pressure range of each connected cylinder assembly to reduce dead space within the connection.

Embodiments of the invention may include one or more of the following, in any of a variety of combinations. The gas may be maintained at a substantially constant temperature during the expansion and/or compression, thereby increasing efficiency of the energy recovery and storage. Maintaining the connection at a substantially constant pressure may include or consist essentially of supplying gas at the intermediate pressure to the connection. The gas may be supplied from a reservoir fluidly connected to the connection. The cylinder assemblies may expand or compress gas simultaneously and in a phase relationship substantially different from 360° divided by the number of cylinder assemblies. The cylinder assemblies may expand or compress gas in alternation, and the gas may be supplied to or from a reservoir during expansion or compression in each cylinder assembly. Expanded gas may be vented to atmosphere. Compressed gas may be stored in a compressed-gas reservoir. Energy stored during compression of the gas may originate from the intermittent renewable energy source, and energy may be recovered via expansion of the gas when the intermittent renewable energy source is nonfunctional.

In a further aspect, embodiments of the invention feature a compressed gas energy storage and recovery system including or consisting essentially of a cylinder assembly for compressing gas to store energy and expanding gas to recover energy, a heat-transfer subsystem, and a mechanism. The cylinder assembly includes or consists essentially of two separated chambers at least one of which is a pneumatic chamber. The heat-transfer subsystem introduces heat-transfer fluid within a pneumatic chamber of the cylinder assembly to exchange heat with gas therein, thereby increasing efficiency of the energy storage and recovery. The mechanism substantially prevents flow of gas from the pneumatic chamber into the heat-transfer subsystem, thereby substantially preventing formation of dead space in the heat-transfer subsystem.

Embodiments of the invention may include one or more of the following, in any of a variety of combinations. The mechanism may include or consist essentially of a check valve. The heat-transfer subsystem may include or consist essentially of a spray head and/or a spray rod disposed within the cylinder assembly. The heat-transfer subsystem may include or consist essentially of one or more orifices disposed within the pneumatic chamber, and the mechanism may include or consist essentially of a check valve disposed on the upstream side of each orifice. The heat-transfer subsystem may include or consist essentially of one or more orifices disposed within the pneumatic chamber and a conduit for supplying the heat-transfer fluid to the orifice(s), and the mechanism may include or consist essentially of a check valve disposed within the conduit (and may further include a check valve disposed on the upstream side of each orifice). The weight of heat-transfer fluid disposed within the conduit (e.g., substantially the entire volume of the conduit) may be insufficient to open the check valve.

The heat-transfer subsystem may include or consist essentially of a heat exchanger and a circulation apparatus for circulating the heat-transfer fluid between the heat exchanger and the cylinder assembly. A piston may be slidably disposed within the cylinder assembly, separating the two chambers. The heat-transfer subsystem may include a hollow rod attached to the piston, and the mechanism (e.g., a check valve) may be disposed within the hollow rod. The heat-transfer subsystem may enable substantially isothermal compression and expansion of gas in the cylinder assembly. A compressed-gas reservoir, for storage of gas after compression and supply of compressed gas for expansion thereof, may be selectively fluidly connected to the cylinder assembly. A vent for exhausting expanded gas to atmosphere and supply of gas for compression thereof may be selectively fluidly connected to the cylinder assembly. An intermittent renewable energy source of, e.g., wind or solar energy, may be connected to the cylinder assembly. Energy stored during compression of the gas may originate from the intermittent renewable energy source, and energy may be recovered via expansion of the gas when the intermittent renewable energy source is nonfunctional.

In yet a further aspect, embodiments of the invention feature a method for energy storage and recovery. Gas is compressed to store energy and/or expanded to recover energy within a pneumatic chamber of a cylinder assembly. A heat-transfer fluid is introduced, via a heat-transfer subsystem, into the pneumatic chamber to maintain the gas at a substantially constant temperature, thereby increasing efficiency of the energy storage and recovery. Flow of gas from the pneumatic chamber into the heat-transfer subsystem is substantially prevented, thereby substantially preventing formation of dead space in the heat-transfer subsystem.

Embodiments of the invention include one or more of the following, in any of a variety of combinations. The heat-transfer fluid may be recirculated between the pneumatic chamber and a heat exchanger to maintain the heat-transfer fluid at a substantially constant temperature. The heat-transfer subsystem may include a check valve therein to substantially prevent flow of the gas into the heat-transfer subsystem. The heat-transfer subsystem may include a spray head and/or a spray rod disposed within the cylinder assembly. The heat-transfer subsystem may include one or more orifices disposed within the pneumatic chamber and a check valve disposed on the upstream side of each orifice. The heat-transfer subsystem may include or consist essentially of one or more orifices disposed within the pneumatic chamber, a conduit for supplying the heat-transfer fluid to the orifice(s), and a check valve disposed within the conduit. The heat-transfer subsystem may additionally include a check valve disposed on the upstream side of each orifice.

These and other objects, along with advantages and features of the invention, will become more apparent through reference to the following description, the accompanying drawings, and the claims. Furthermore, it is to be understood that the features of the various embodiments described herein are not mutually exclusive and can exist in various combinations and permutations. Note that as used herein, the terms "pipe," "piping" and the like shall refer to one or more conduits that are rated to carry gas or liquid between two points. Thus, the singular term should be taken to include a plurality of parallel conduits where appropriate. Herein, the terms "liquid" and "water" interchangeably connote any mostly or substantially incompressible liquid, the terms "gas" and "air" are used interchangeably, and the term "fluid" may refer to a liquid or a gas unless otherwise indicated. As used herein unless otherwise indicated, the term "substantially" means ±10%, and, in some embodiments, ±5%. A "valve" is any mechanism or component for controlling fluid communication between fluid paths or reservoirs, or for selectively permitting control or venting. The term "cylinder" refers to a chamber, of uniform but not necessarily circular cross-section, which may contain a slidably disposed piston or other mechanism that separates the fluid on one side of the chamber from that on the other, preventing fluid movement from one side of the chamber to the other while allowing the transfer of force/pressure from one side of the chamber to the next or to a mechanism outside the chamber. A "cylinder assembly" may be a simple cylinder or include multiple cylinders, and may or may not have additional associated components (such as mechanical linkages among the cylinders). The shaft of a cylinder may be coupled hydraulically or mechanically to a mechanical load (e.g., a hydraulic motor/pump or a crankshaft) that is in turn coupled to an electrical load (e.g., rotary or linear electric motor/generator attached to power electronics and/or directly to the grid or other loads), as described in the '595 and '853 applications.

BRIEF DESCRIPTION OF THE DRAWINGS

In the drawings, like reference characters generally refer to the same parts throughout the different views. Cylinders, rods, and other components are depicted in cross section in a manner that will be intelligible to all persons familiar with the art of pneumatic and hydraulic cylinders. Also, the drawings are not necessarily to scale, emphasis instead generally being placed upon illustrating the principles of the invention. In the following description, various embodiments of the present invention are described with reference to the following drawings, in which:

FIGS. 1A-1I are a series of schematic drawings of a single-acting cylinder with a movable piston and an external valve manifold for admitting high-pressure gas and venting fluid from the cylinder, according to various embodiments of the invention;

DETAILED DESCRIPTION

Figure 1A:
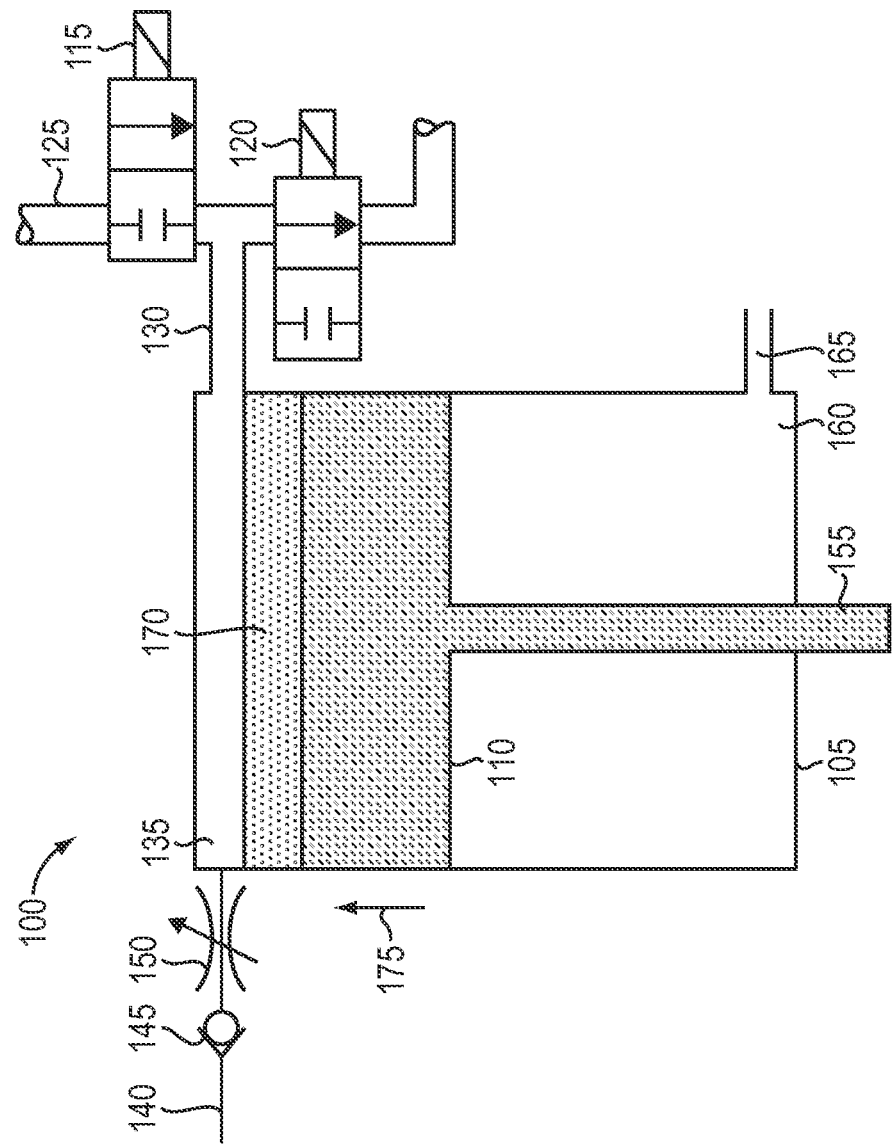

FIG. 1A is a schematic drawing of a system 100 for minimizing air dead volume in pneumatic components that includes a single-acting cylinder 105 with a movable piston 110 and an external manifold composed of two valves 115, 120 for admitting high-pressure (e.g., approximately 3,000 psi) gas to the cylinder and allowing gas and/or liquid to exit the cylinder, according to various embodiments of the invention. A pneumatic line 125 communicates with a store of high-pressure gas (not shown). Both valves 115, 120 communicate through a line 130 with the upper or first chamber 135 of the cylinder 105. A liquid inlet line 140 communicates with a source of pressurized liquid (not shown). The liquid may pass through a check valve 145 and a flow-control valve 150. The check valve 145 may be, e.g., a spring-operated poppet valve, a spring-operated ball valve, a swing check valve, or other type of check valve. For example, check valve 145 may be an inline spring-operated poppet-type check valve such as those available from Kepner Products Company, Illinois. In various embodiments, check valve 145 and/or flow-control valve 150 may be replaced or supplemented with a circulation apparatus such as a pump. The piston shaft 155, which is mechanically coupled to piston 110, typically communicates with some mechanical load (not shown).

As shown in FIG. 1A, valve 115 is closed and valve 120 is open, and air in the lower chamber 160 of the cylinder 105 comes and goes freely through a vent 165, which may include a valve. The piston 110 is moving upward, performing a non-working (return) stroke. A quantity of liquid 170 is present in the upper chamber 135; in the case of a vertically oriented cylinder assembly, the liquid 170 typically lies on top of the piston 110, which is approaching its limit of motion in the direction indicated by arrow 175. The liquid 170 partially occupies the upper chamber 135 of the cylinder 105; the remainder of the upper chamber 135 is occupied by gas at relatively low pressure. The line 130, any interior volumes of the valves 115, 120 that communicate with the line 130, and the gas-filled portion of the upper chamber 135 of the cylinder 105 when it has been reduced to its minimum volume at the end of the return stroke of the piston 110 are collectively, in effect, a single intercommunicating volume of dead space.

Figure 1B:
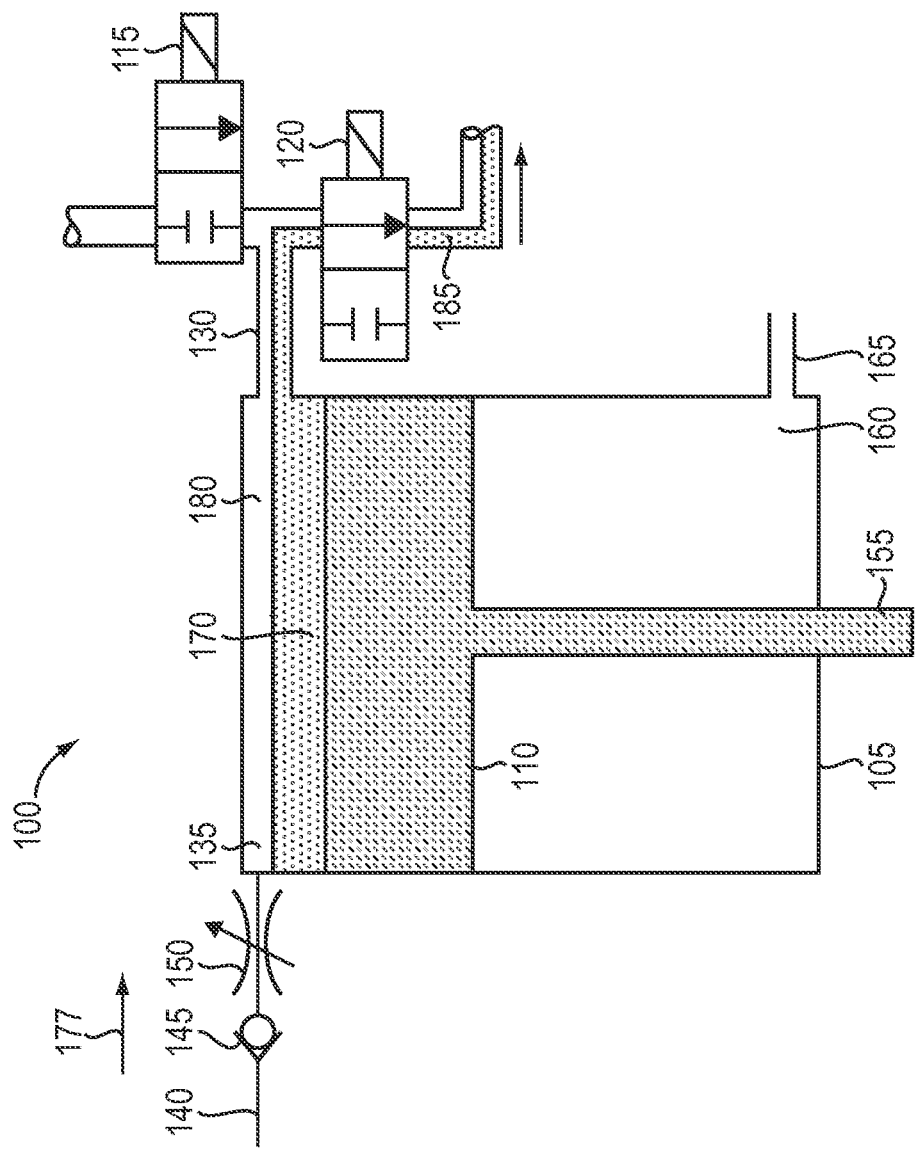

FIG. 1B shows the system 100 with the piston 110 at its limit of upward motion and with liquid 170 beginning to fill the dead space at the top of the cylinder 105. Additional liquid flows through the line 140 as shown by arrow 177, through the check valve 145 and flow-control valve 150, and into the chamber 135, where it accumulates on top of the piston 110. Valve 115 is closed and valve 120 is open. As liquid enters the chamber 135, air 180, possibly mixed with the liquid, is forced out of the dead space through valve 120. The flow-control valve 150 is adjusted, e.g., by computer or other control system, to achieve the optimal liquid flow rate such that the dead space is completely filled while liquid flow through valve 120 is minimized. For example, a pressure sensor and/or a flow meter may be utilized to indicate when the dead space has been substantially filled with the liquid. The air and/or liquid vented from the chamber 135 through valve 120 are conducted through a line 185 to a vent or low-pressure cylinder (see, for example, FIGS. 2A-2E).

Line 140 may be connected to, or even a portion of, a heat-transfer subsystem designed to introduce liquid into the chamber 135 for heat exchange with gas within the chamber 135 during expansion and/or compression, as described above. For example, the same circulation apparatus (e.g., one or more pumps) may be utilized to circulate heat-transfer fluid (e.g., water) through chamber 135 and an external heat exchanger, as well as to meter the amount of liquid (e.g., water) utilized to fill dead space in chamber 135 and/or other portions of system 100.

Figure 1C:
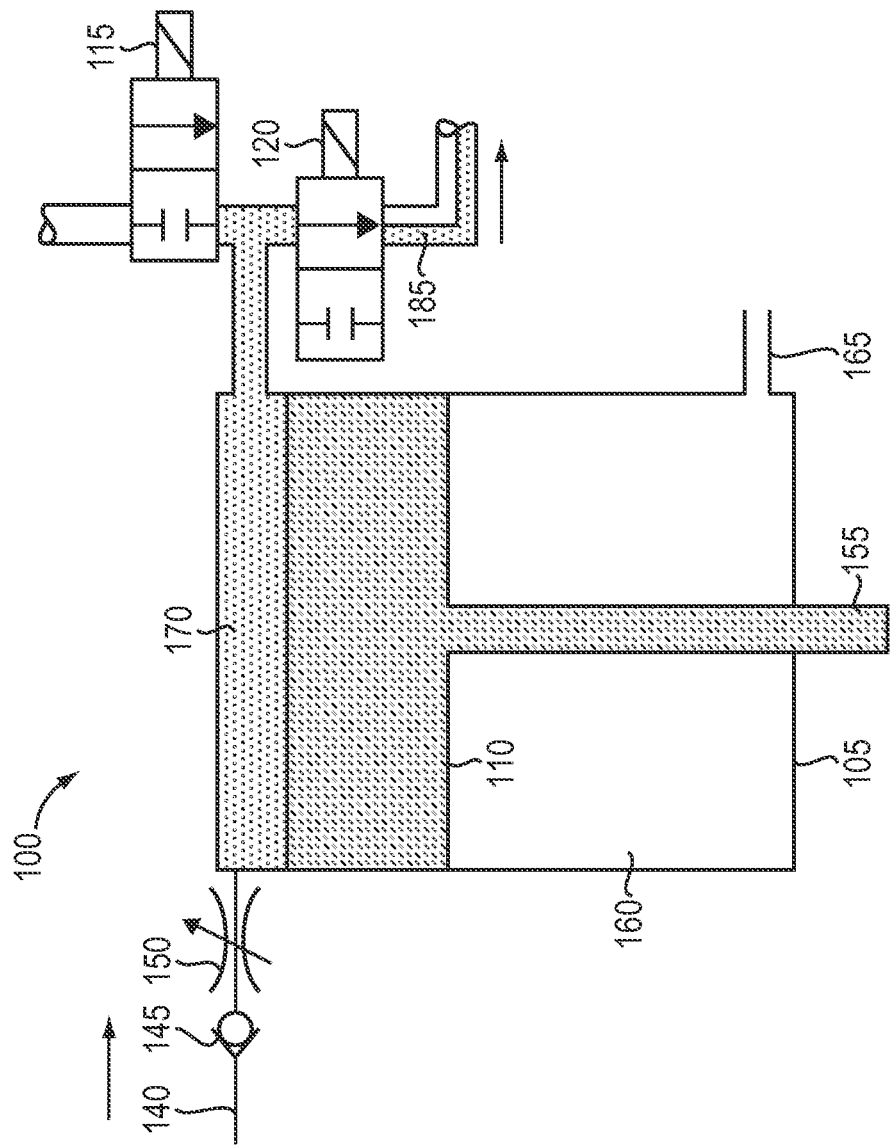

FIG. 1C shows the system 100 in a state where all dead space in the cylinder 105 has been filled with the incompressible fluid or liquid (e.g., water) 170, but some dead space inside valve 120 is still in the process of being displaced by the liquid, while air and/or the liquid are still exiting the system 100 through line 185.

Figure 1D:
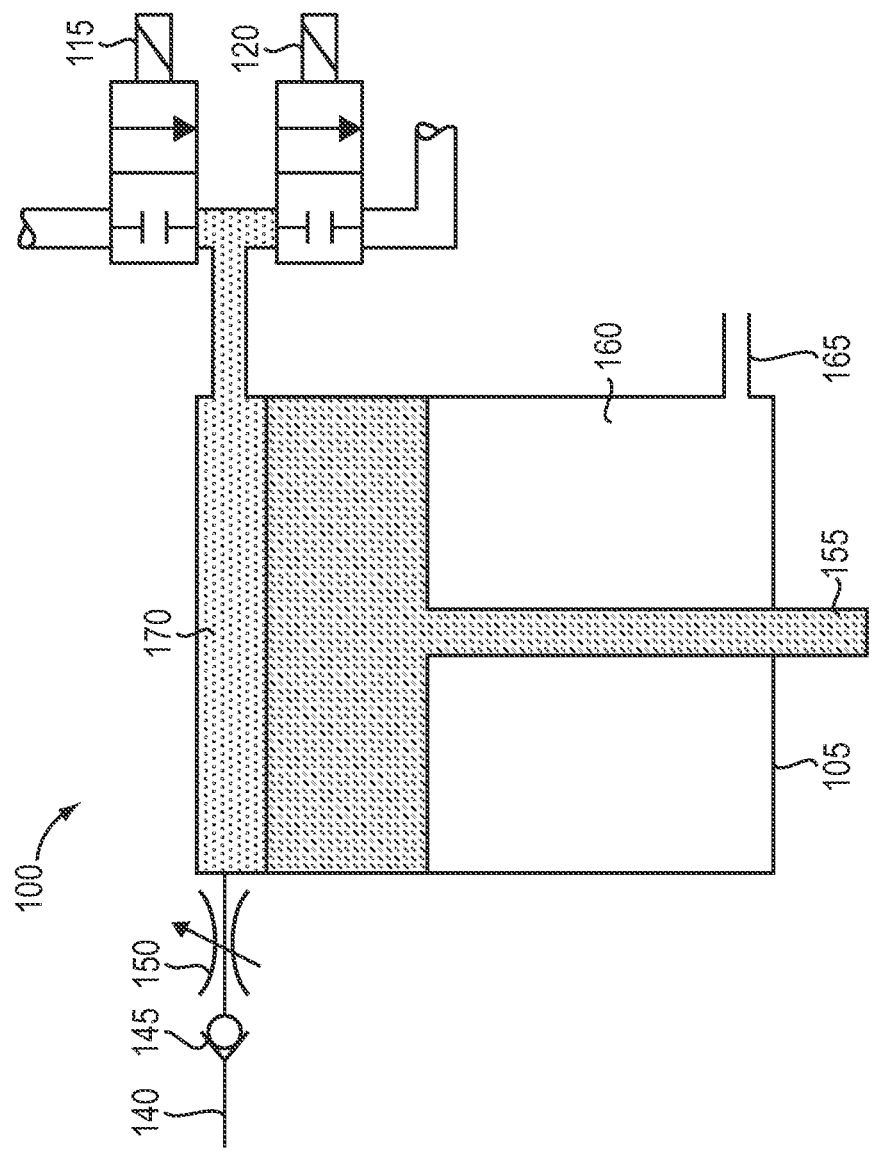

FIG. 1D shows the system 100 in a state following the state depicted in FIG. 1C, where substantially all dead space in the cylinder 105 and the valves 115, 120 has been filled with the liquid 170. Valve 120 is now closed and the system 100 is temporarily sealed off.

Figure 1E:
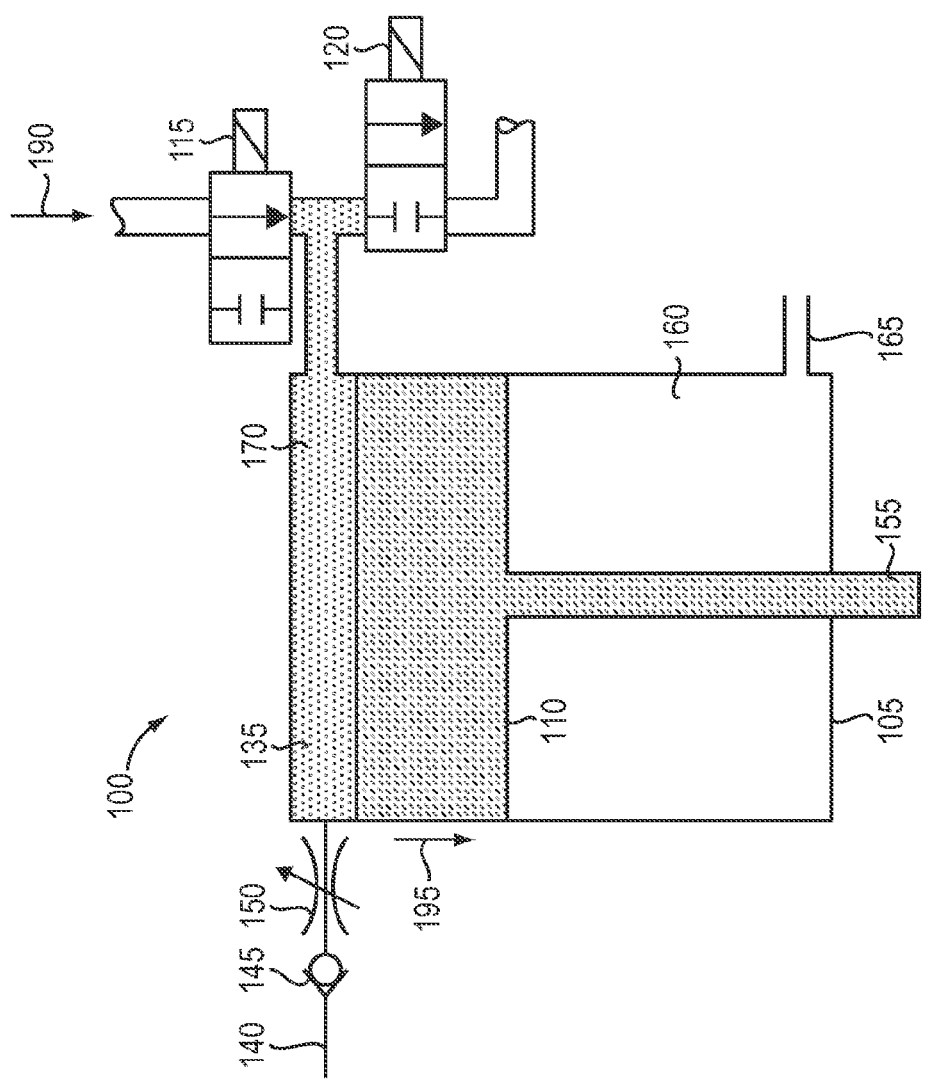

FIG. 1E shows the system 100 in a state where valve 115 has been opened, allowing high-pressure air to enter the system 100 as shown by arrow 190. The piston 110 begins to move downward as the high-pressure air expands into chamber 135, thereby performing work on the piston 110, as shown by arrow 195. The dead space is still filled with the liquid 170. The check valve 145 prevents the liquid 170 from exiting through line 140. The liquid pressure is raised to the pressure of the high-pressure gas impinging on the liquid 170. The high-pressure air entering the valve 115 generally transmits a force to all surfaces with which it is in contact, including the liquid 170 and thus the upper surface of the piston 110. Since only the piston 110 and rod 155 move as force is applied to it, substantially no work is performed on other system components. The liquid 170 is negligibly compressed as it is raised to high pressure. If the dead space in the system 100 had not been filled with the incompressible fluid 170 prior to the state shown in FIG. 1E, the high-pressure air would freely expand into the dead space and the amount of mechanical work extractable from the expanding air would have been diminished.

Figure 1F:
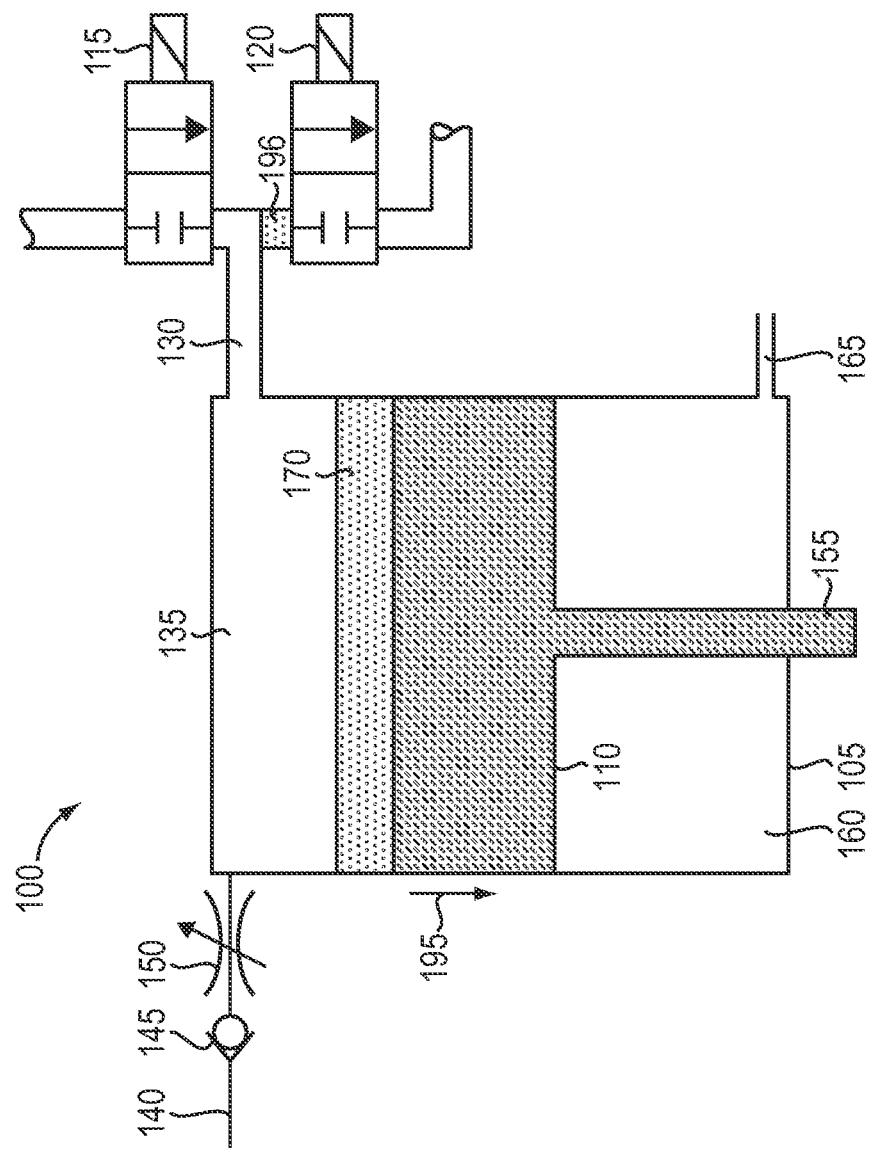

FIG. 1F shows the system 100 in a state after a quantity of high-pressure air has been admitted to the system and valve 115 has been closed. The air is expanding in the upper chamber 135 of the cylinder 105 and performing work upon the piston 110, pushing it downward as shown by arrow 195. A quantity of liquid 196 remains in a portion of line 130 and in valve 120, reducing the amount of high-pressure air that will be wasted from those volumes when valve 120 is opened. In addition, vent 165 is open and allows any air within the lower chamber 160 to be vented to atmosphere.

Figure 1G:
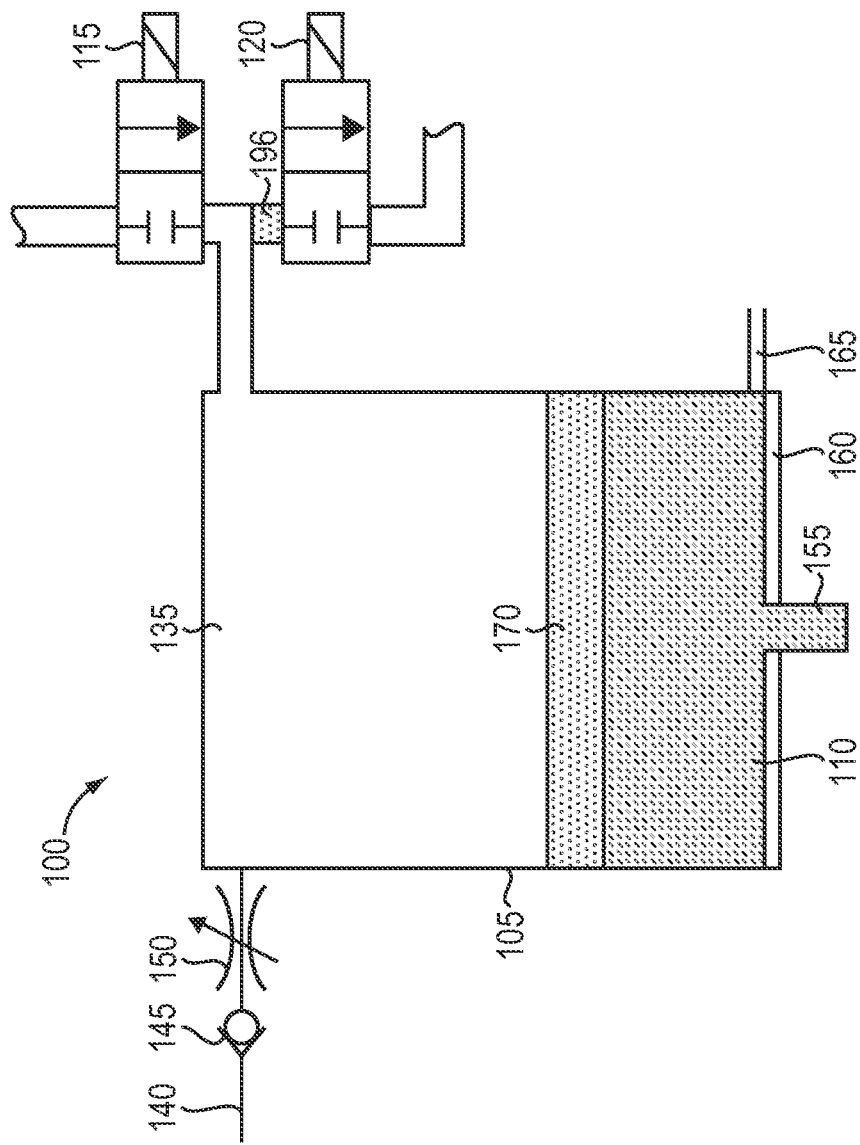

FIG. 1G shows the system 100 in a state where valves 115 and 120 are closed and no more high-pressure gas is being admitted to the cylinder 105. The quantity of gas admitted has caused the piston 110 to reach its limit of travel.

Figure 1H:
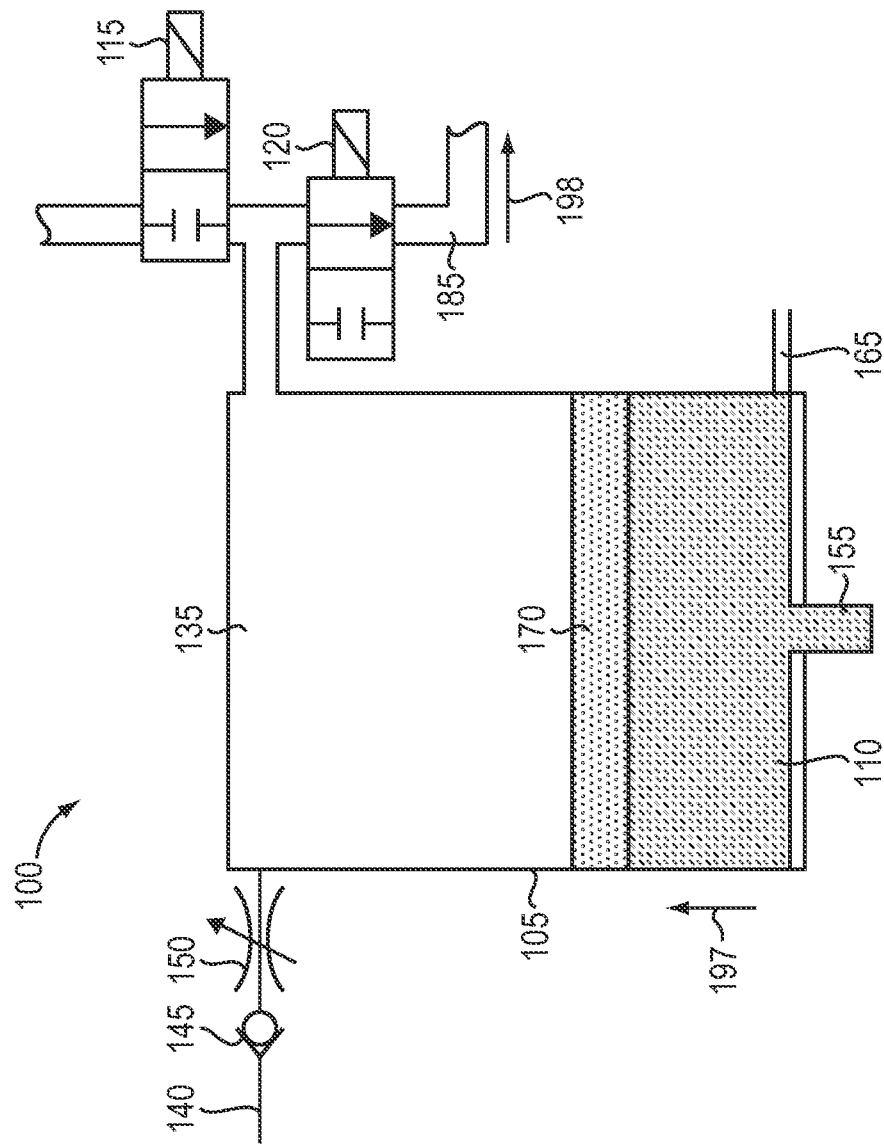

FIG. 1H shows the system 100 in a state corresponding to the start of the return (i.e., non-working stroke) of the piston 110. As shown, vent valve 120 is open to allow gas to be expelled from the upper chamber 135 of the cylinder 105 and the piston 110 is being moved upward (arrow 197). The air is transferred at a pressure lower than or equal to the pressure of the originally admitted high-pressure air through line 185, as shown by arrow 198.

FIG. 1I shows the system 100 in a state corresponding to the completion of one cycle of the system 100, where the piston 110 is at the top of its return stroke and in a position identical to that depicted in FIG. 1A.

FIGS. 2A-2E depict an alternative system 200 for minimizing air dead volume in pneumatic components that includes two coupled single-acting pneumatic cylinders 202, 204. Generally, one cylinder 202 operates over a relatively high pressure range (e.g., approximately 250 to approximately 3,000 psig) and the second cylinder 204 operates over a relatively low pressure range (e.g., approximately 0 to approximately 250 psig). The expansion chamber 216 of the higher-pressure cylinder 202 is coupled to the expansion chamber 226 of the lower-pressure cylinder 204. As described below, dead space in the line connecting the two cylinders, as well as in the expansion chambers and associated valves of both cylinders, is substantially filled with a substantially incompressible fluid to prevent loss of energy.

In an energy storage and retrieval system employing compressed gas, one reason for using two or more cylinders is to produce a narrower range of output force (e.g., in a system using a rigid common beam acted upon jointly by the pistons of the cylinders) over a given range of high-pressure-reservoir pressures, examples of which are described in the '595 and '853 applications.

The operation of the high-pressure cylinder 202 is substantially identical to that described with respect to cylinder 105 and FIGS. 1A-1I. The low-pressure cylinder 204 operates similarly to cylinder 202, but is 180° out of phase. In addition, a long connection line or pneumatic conduit (e.g., hose or pipe) 206 is shown after the valve 208 between cylinder 202 and cylinder 204. As described below and illustrated in FIGS. 2A-2E, this connection line 206 represents potential dead volume during coupling and may also be filled with liquid by appropriate location and use of a fill line 210 and valves 212, 214.

Figure 2A:
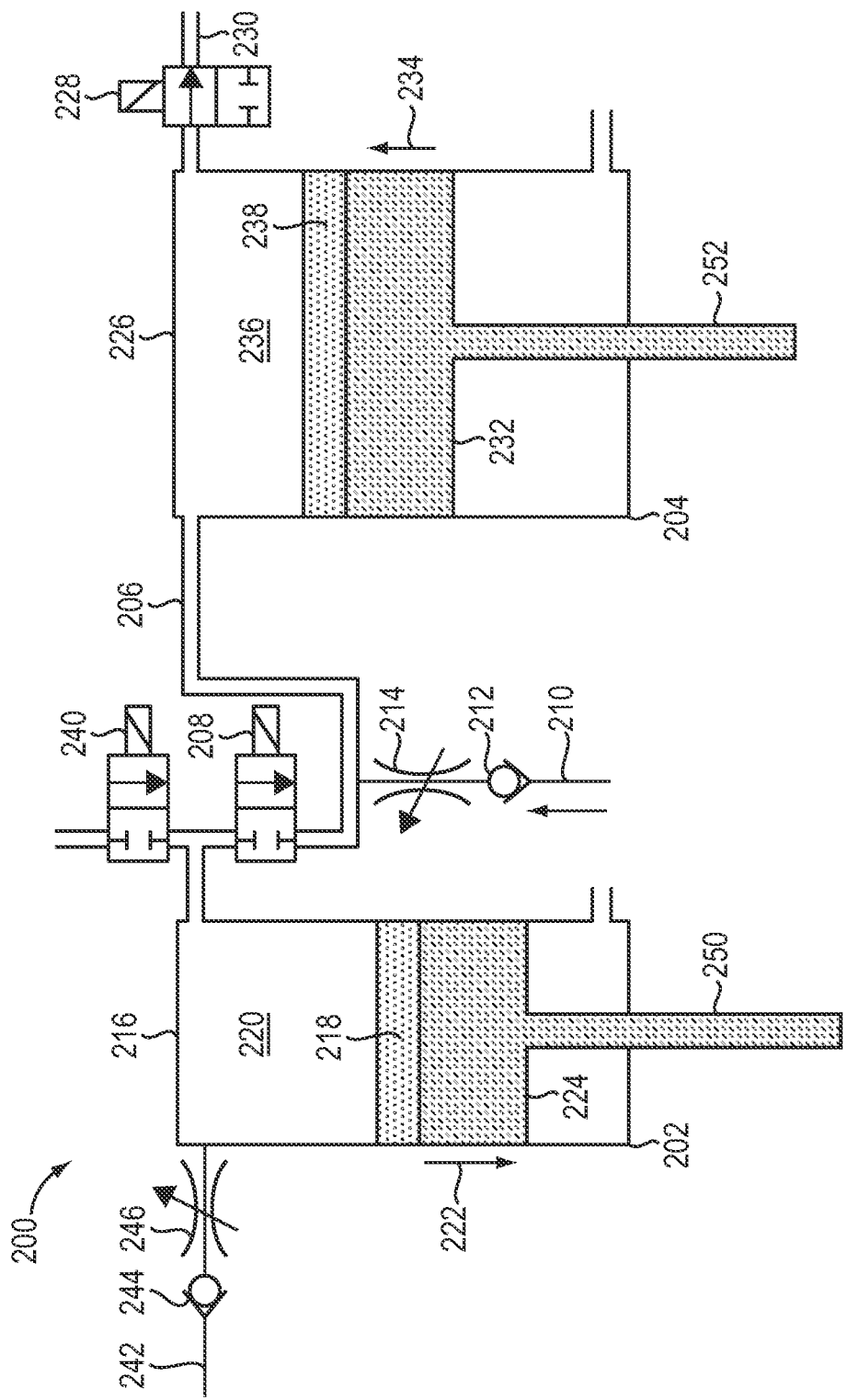
FIGS. 2A-2E are a series of schematic drawings of two coupled single-acting pneumatic cylinders according to various alternative embodiments of the invention.

FIG. 2A shows the system 200 in an initial state where the dead space is unfilled and no expansion of gas is occurring. The operation and position of the high-pressure cylinder 202 is shown in the same general state as cylinder 105 in FIG. 1F. As shown, the upper chamber 216 of the high-pressure cylinder 202 is filled partially by a liquid 218 and partially by air 220 at high pressure (e.g., between approximately 250 and approximately 3,000 psig) expanding towards a mid-pressure (e.g., approximately 250 psig), which will occur at the end of a downward stroke (arrow 222). The expanding high-pressure air in chamber 216 is performing work upon the piston 224 and driving the piston 224 downward, as shown by arrow 222.

An upper chamber 226 of the low-pressure cylinder 204 communicates with the environment through currently opened valve 228 and a vent 230 and is, therefore, at substantially atmospheric pressure. As piston 232 is being moved upward (as indicated by arrow 234), air at atmospheric pressure 236 is being vented out of the upper chamber 226 through valve 228 and vent 230. Some liquid 238 is also shown as present in chamber 226. The operation and position of cylinder 204 is shown in the same general state as cylinder 105 in FIGS. 1A and 1I.

At the completion of the downward stroke of high-pressure cylinder 202 and the upward stroke of the low-pressure cylinder 204, valve 208 will be opened to allow the then mid-pressure air 220 from within the upper chamber 216 to expand further in the low-pressure cylinder 204 through pneumatic line 206. In FIG. 2A the line 206 is shown primarily filled with atmospheric-pressure air and thus will act as dead space when coupled with the mid-pressure air 220. Additionally, at the end of the upward stroke of the low-pressure cylinder 204, the chamber 226 may be filled partially with liquid 238 and partially with atmospheric-pressure air 236. The atmospheric-pressure air 236 will also typically act as dead space when coupled with the mid-pressure air 220. Entrance of liquid into the line 206 from the pressurized liquid source/line 210 is controlled by the check valve 212 and flow-control valve 214.

Valve 240 enables the admittance of high-pressure (e.g., approximately 3,000 psig) gas into the upper chamber 216 of the high-pressure cylinder 202. A liquid inlet line 242 communicates with a source of pressurized liquid (not shown). The liquid may pass through a check valve 244 and a flow-control valve 246. The operation of valve 240 and filling of the dead space during the high-pressure expansion are substantially the same as described above with respect to FIGS. 1A-1I. Alternatively or additionally, the upper chamber 216 of the high-pressure cylinder 202 may be filled via the use of the fill line 210 and valves 212, 214 associated with the connection line 206 and valve 208.

The piston shaft 250 of the high-pressure cylinder 202 is typically attached to some mechanical load (not shown). The piston shaft 252 of the low-pressure cylinder 204 may be attached to the same or a different mechanical load. In the embodiments shown herein, the two cylinders 202, 204 operate reciprocally, i.e., as high-pressure air is expanded in the upper chamber 216 of the high-pressure cylinder 202, depressing the piston 224 and its shaft 250, the low-pressure cylinder 204 is venting atmospheric-pressure air (i.e., its piston 232 is moving upward). When air expands to approximately mid-pressure in cylinder 202 with a fully complete downward stroke, the mid-pressure air is directed to low-pressure cylinder 204, which is at the top of its stroke. The air then flows through line 206 into the upper chamber 226 of the low-pressure cylinder 204 and performs work upon its piston 232 by driving the piston 232 downward. In this arrangement, the volumes occupied by the low-pressure air in line 206, valves 208 and 228, and in the upper chamber 226 of the low-pressure cylinder 204 constitute dead space. Appropriate operation of the components shown in FIG. 2A eliminates this dead space by filling the space with a substantially incompressible fluid, thus increasing the amount of energy extractable from a given quantity of mid-pressure air 220. The operation is described below.

At any point after cylinder 204 completes its downward stroke and is vented to atmospheric pressure, liquid may be admitted at near-atmospheric pressure into line 206 to substantially fill that line, diminishing potential dead space. Air that is present in line 206 will generally be vented through valve 228 and vent 230, as shown in FIG. 2A. For different orientations, a separate or additional vent valve may be present, such as with valve 208, such that substantially all trapped air may be vented. In FIG. 2A, the liquid is shown being admitted through line 210, check valve 212, and flow control valve 214 to commence filling line 206.

Figure 2B:
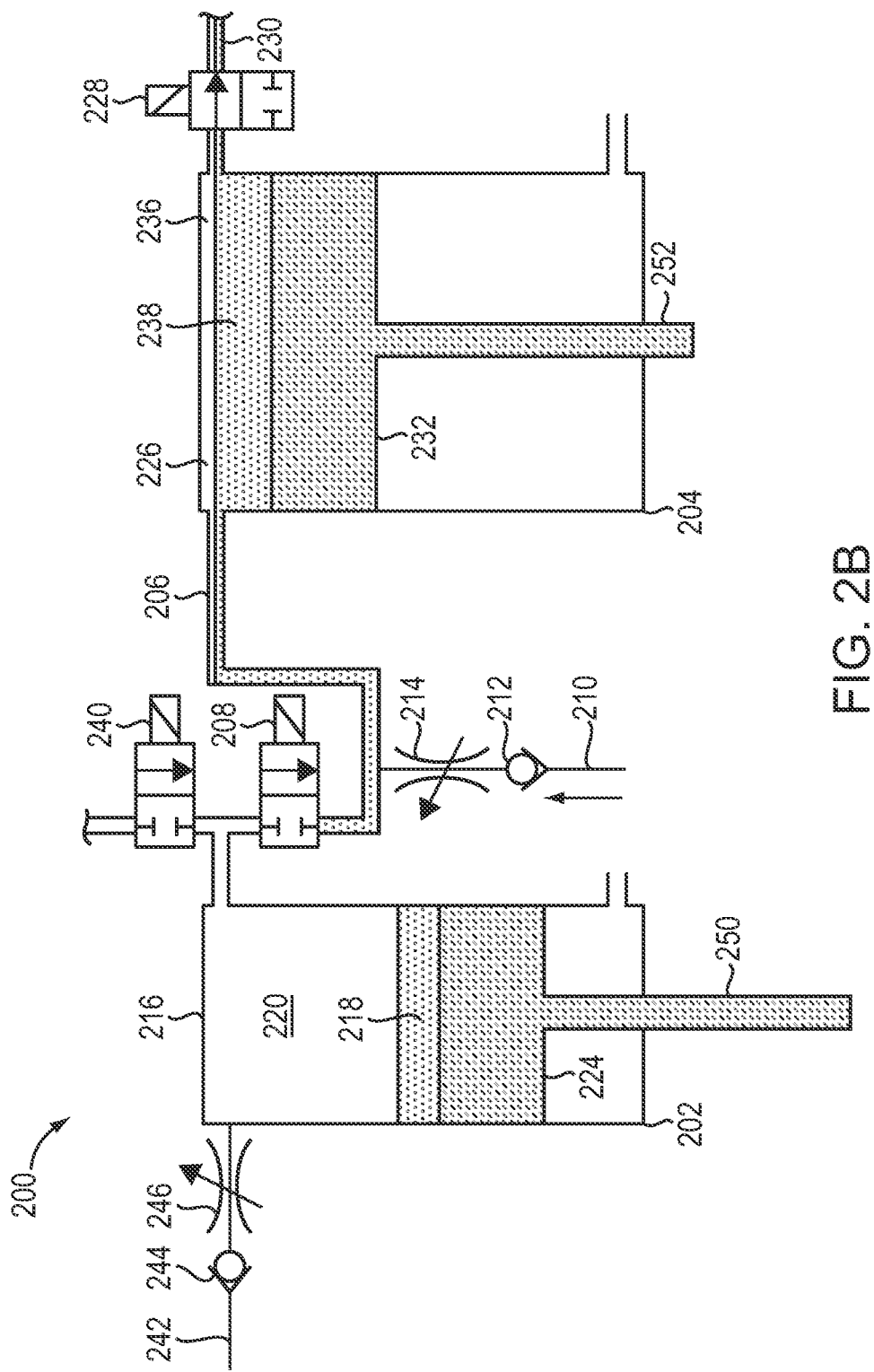

FIG. 2B shows the system 200 as the downward motion of piston 224 and the upward motion of piston 232 have just been completed and the system dead space is being filled with liquid. As shown, the upper chamber 216 of the high-pressure cylinder 202 is partially filled by the liquid 218 and by air 220 at mid-pressure (e.g., approximately 250 psig) after completing an expansion from high pressure (e.g., approximately 3,000 psig). The operation and position of cylinder 202 are shown in the same general state as cylinder 105 shown in FIG. 1G, with piston 224 at or near its lowest position. The upper chamber 226 of the low-pressure cylinder 204 communicates with the environment through currently opened valve 228 and vent 230 and is, therefore, at substantially atmospheric pressure. The operation and position of cylinder 204 is shown in the same general state as cylinder 105 in FIG. 1B, with piston 232 at or near its highest position. The line 206 is shown nearly filled with liquid, removing nearly all dead space that would otherwise be brought into communication with the mid-pressure air 220 when valve 208 is opened. The chamber 226 is partially filled with the liquid 238 and partially with atmospheric-pressure air 236. Atmospheric-pressure air remaining in chamber 226 will generally also constitute dead space when coupled with mid-pressure air 220. Entrance of liquid into line 206 and chamber 226 continues from the pressurized liquid line 210 as controlled by check valve 212 and flow-control valve 214.

Figure 2C:
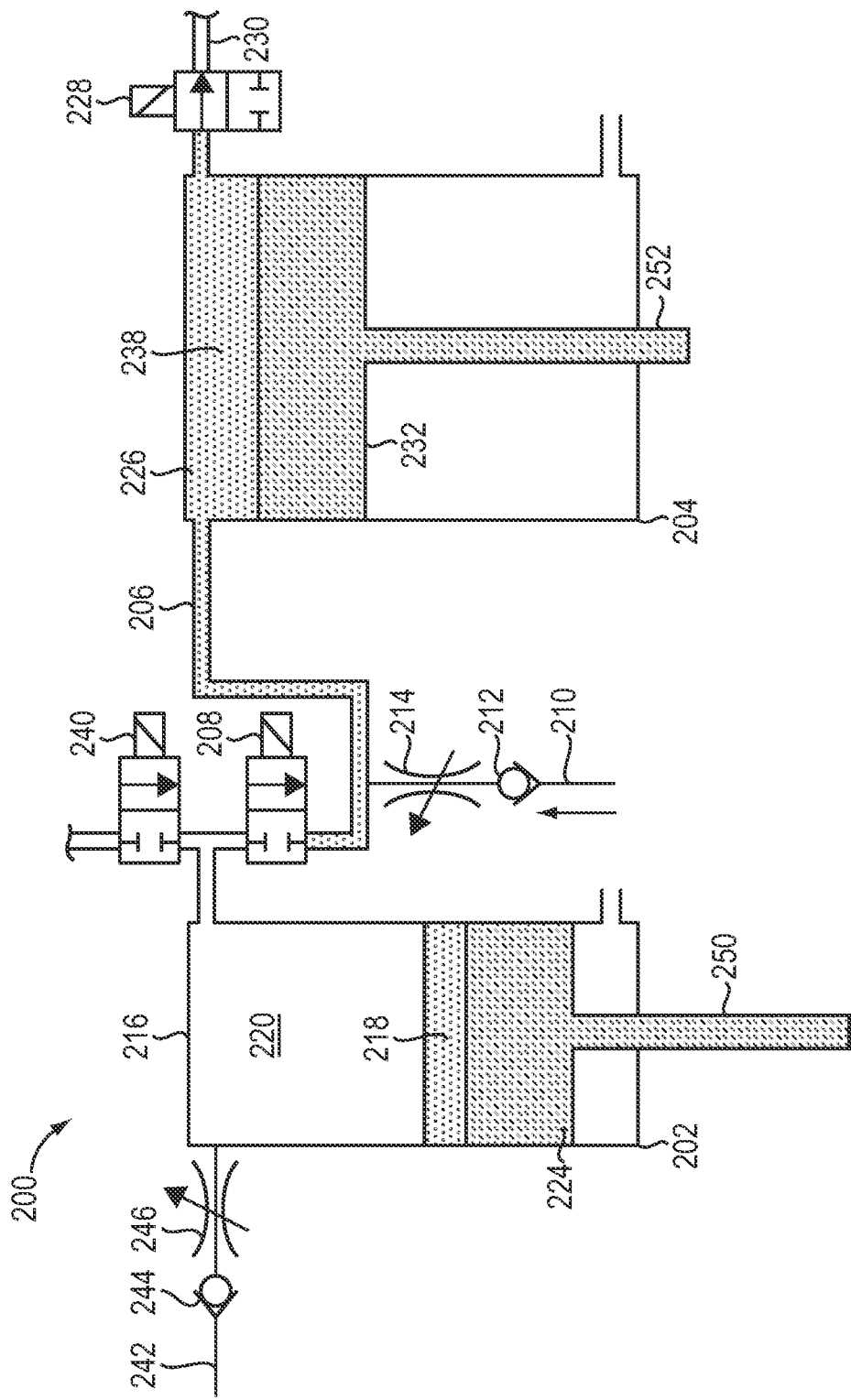

In FIG. 2C, the process illustrated in FIG. 2B has been completed and essentially all dead space in the chamber 226, valves 208 and 228, and line 206 is filled with liquid. Valves 240, 208, and 228 are closed.

Figure 2D:
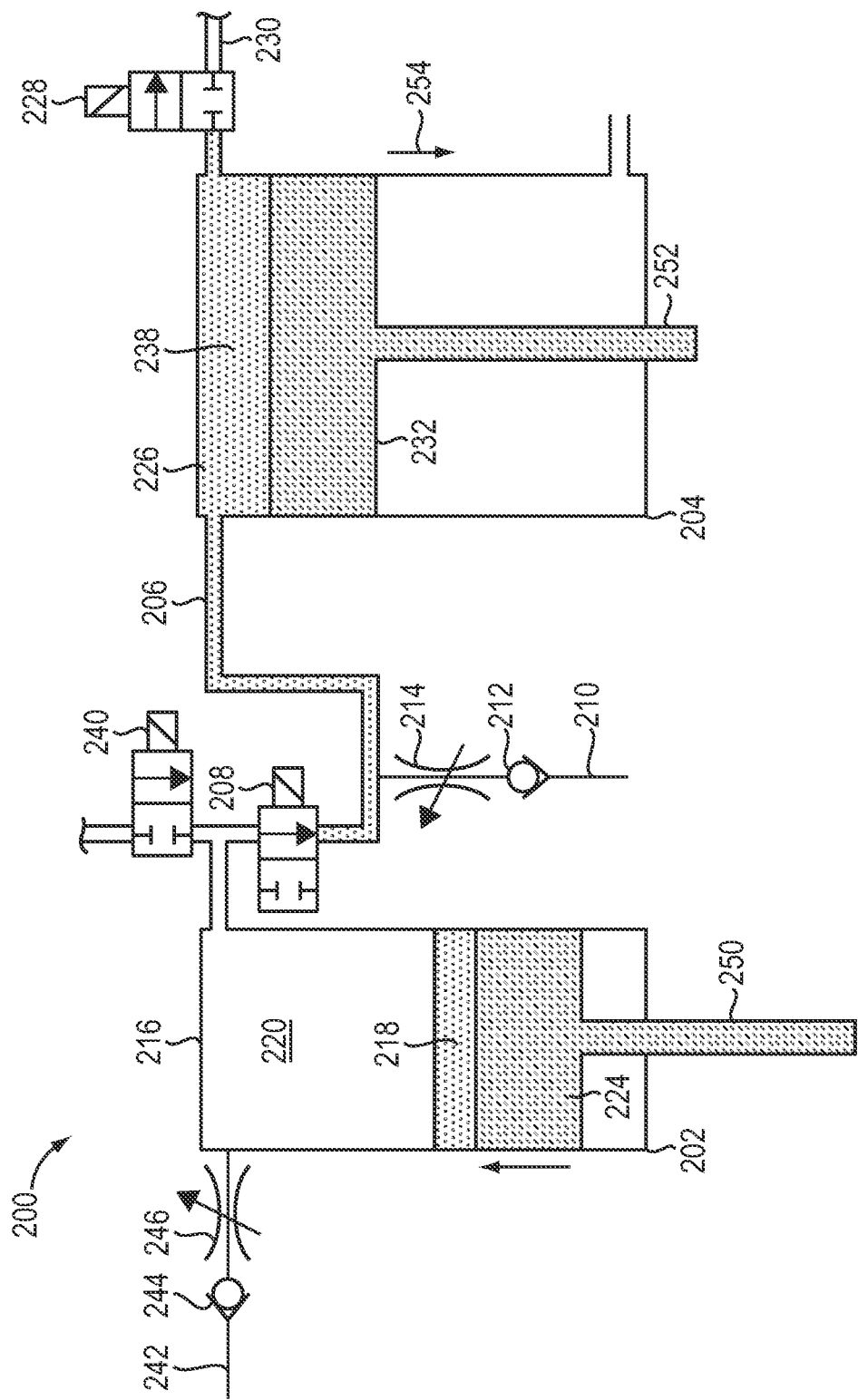

FIG. 2D shows the system 200 during an expansion cycle. As shown, valve 208 is opened to allow the mid-pressure air 220 to expand into the low-pressure cylinder 204 through pneumatic line 206. As shown, all or nearly all of the dead space related to the coupling of cylinder 202 with cylinder 204 has been filled with the liquid 238. If the dead space had not been filled with the liquid prior to the state shown in FIG. 2D, mid-pressure air 220 would freely expand into the dead space and the amount of mechanical work extractable from the expanding air would have been diminished. The expanding mid-pressure air in chamber 216 and fluid in chamber 226 is performing work upon the piston 232, moving it downward as shown by arrow 254. The operation and position of cylinder 204 are shown in the same general state as cylinder 105 in FIG. 1E. Piston 224 is being moved upward, transferring air from chamber 216 through line 206 into chamber 226. The operation and position of cylinder 202 are shown in the same general state as cylinder 105 in FIG. 1H. Liquid no longer flows into line 206, as the pressure in the line is increased to the mid-pressure and the check valve 212 prevents liquid from exiting through the liquid line 210.

Figure 2E:
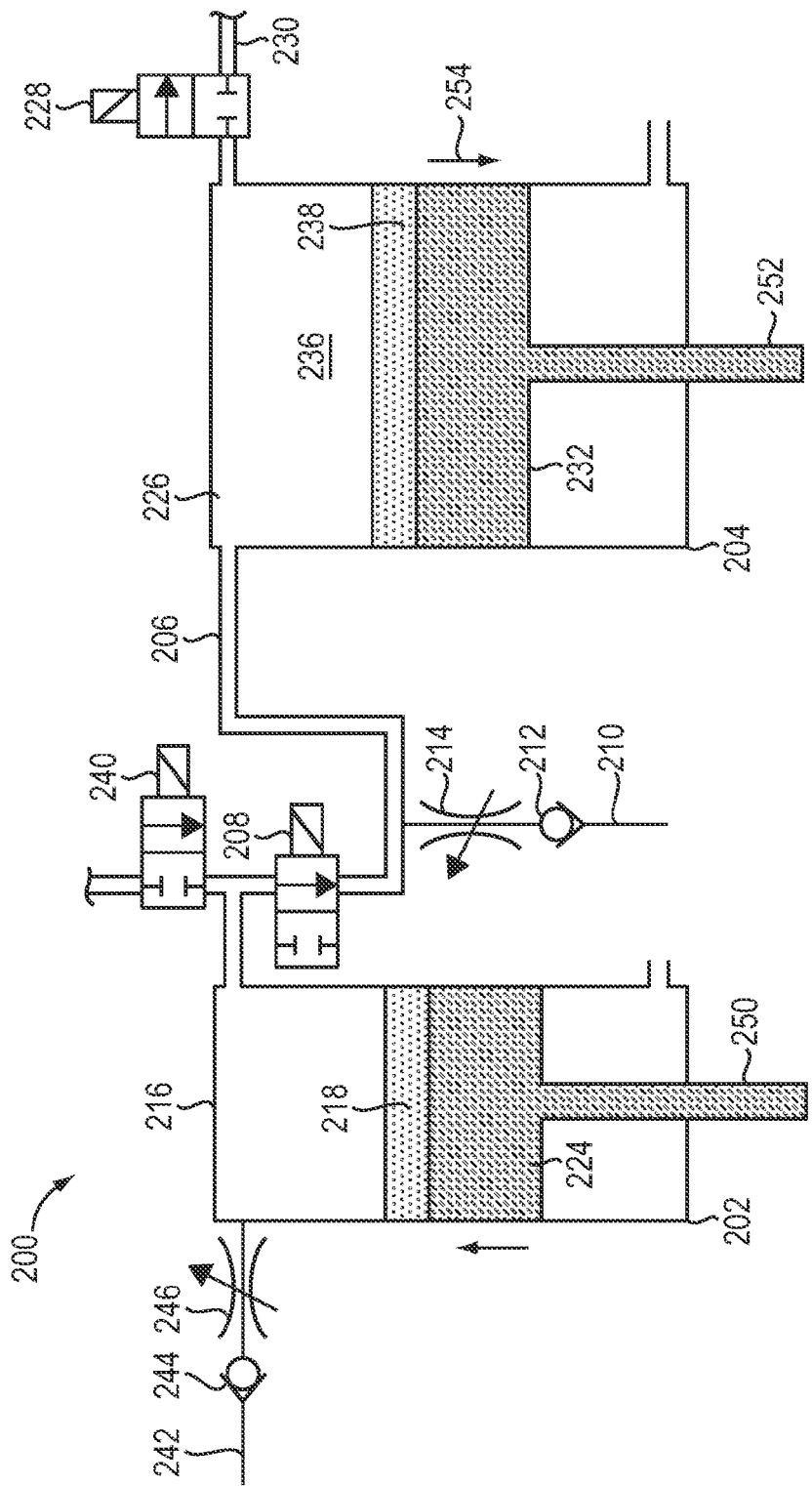

FIG. 2E shows the system 200 after a quantity of mid-pressure air has expanded from chamber 216 to chamber 226. As cylinder 204 is larger in diameter than cylinder 202, the pressure of the mid-pressure air has dropped relative to FIG. 2D, as it performs work on piston 232, driving the piston 232 in a downward direction (as indicated by arrow 254). The air continues to expand in chambers 216 and 226, continuing to perform work upon piston 232.

The system 200 shown in FIGS. 2A-2E employs single-acting cylinders that, after completing the expansion stroke shown in FIG. 2E, may continue the cycle, as illustrated in FIGS. 1A-1I, as will be clear to those familiar with the art of pneumatic machines. Additional embodiments of the invention utilize double-acting cylinders, otherwise similar to those depicted herein, that are capable of performing a work stroke in both directions. Such systems are described in the above incorporated applications, including the '853 application. Embodiments of the invention may be applied to the elimination of dead space in any or all of the lines, valves, and chambers of such systems (and/or pneumatic chambers of pneumatic/hydraulic cylinders), or of similar systems employing any number of pneumatic cylinders, valves, and lines. Similarly, the filling of cylinders with pressurized liquid to force air out of the cylinders (thereby minimizing or eliminating dead space) before or during compression may be achieved using the same design and process.

Figure 3:
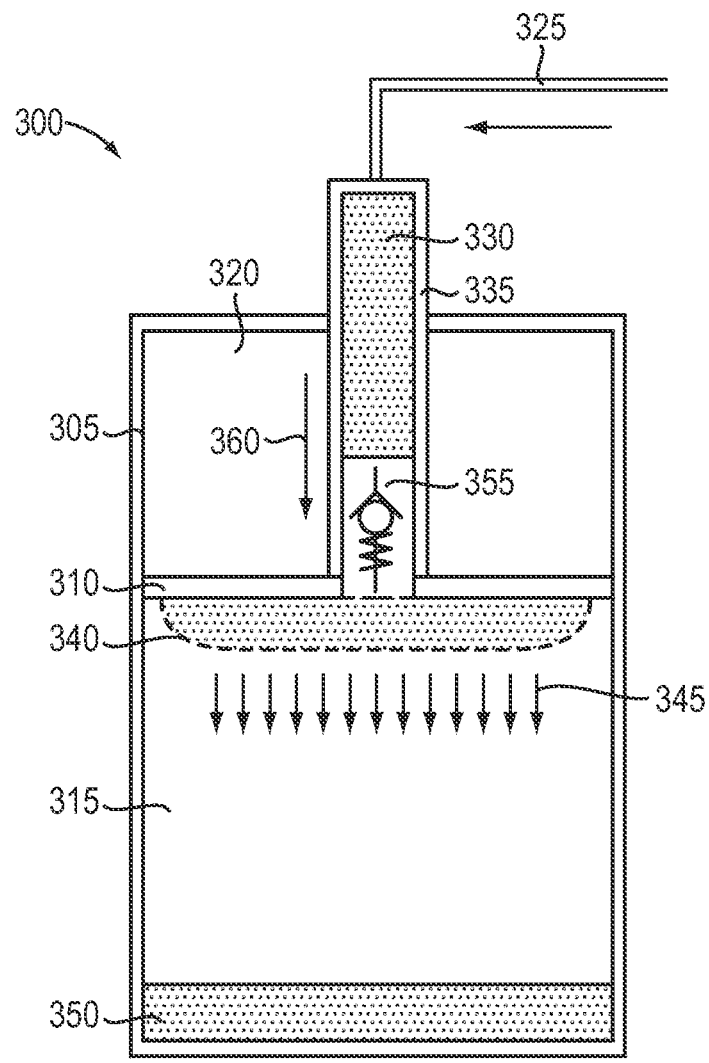
FIG. 3 is a schematic cross-section of a pneumatic expander-compressor through which a heat-exchange liquid may be circulated, in accordance with various embodiments of the invention.

Embodiments of the present invention also substantially prevent the occurrence of (or minimize or eliminate) dead space inside hydraulic components (e.g., heat-exchange subsystems) of energy storage and recovery systems. FIG. 3 depicts an illustrative system 300 that compresses or expands gas in accordance with various embodiments of the invention. System 300 includes a vertically-oriented cylinder 305 containing a mobile piston 310 that divides the interior of the cylinder 305 into a gas-filled (pneumatic) chamber 315 and a liquid-filled (hydraulic) chamber 320. Alternatively, both chambers 315 and 320 may be gas-filled. A pipe 325 conducts liquid (indicated by stippling) to a center-drilled passage 330 within a rod 335 attached to the piston 310. The center-drilled passage 330 is in fluid communication with the interior of a spray head 340 (or other suitable spray mechanism, such as a spray rod extending through at least a portion of the length of cylinder 305) that injects a spray 345 of heat-transfer-liquid droplets into the lower chamber 315 of the cylinder 305. The heat-transfer liquid may include or consist essentially of, e.g., water or another suitable liquid. This spray 345 may produce an accumulation of liquid 350 at the bottom of the lower chamber 315. A port or ports (not shown) with associated pipes and valves (not shown) allows gas to be admitted to or exhausted from chamber 315 as desired. A port or ports (not shown) with associated pipes and valves (not shown) allows fluid to be admitted to or withdrawn from the upper chamber 320 as desired. A port or ports (not shown) with associated pipes and valves (not shown) allows for the liquid accumulation 350 to be withdrawn from the lower chamber 315 as desired.

During air expansion, gas in chamber 315 expands, performing work on piston 310. As the gas in chamber 315 expands, its temperature tends to fall. If during expansion the spray 345 enters chamber 315 at a suitable temperature (e.g., the approximate temperature of the gas in chamber 315 before compression begins), then the spray 315 is at a higher temperature during expansion than the gas in chamber 315, and the spray 345 transfers thermal energy to the gas in chamber 315. The transfer of thermal energy from the spray 345 to the gas in chamber 315 increases the amount of work performed by the expanding gas on the piston 310. In effect, this transfer of thermal energy from the spray 345 to the gas in chamber 315 allows the conversion of some of the thermal energy in the spray 345 into work.

During air compression, piston 310 moves downward and thus compresses the gas in chamber 315. While the gas in chamber 315 is being compressed by the piston 310, its temperature tends to rise. If during compression the liquid spray 345 enters chamber 315 at a suitable temperature (e.g., the approximate temperature of the gas in chamber 315 before compression begins), then the gas in chamber 315 is at a higher temperature during compression than the spray 345, and the gas in chamber 315 transfers thermal energy to the spray 345. The transfer of thermal energy to the spray 345 from the gas in chamber 315 reduces the amount of work that the piston 310 performs on the gas in chamber 315 in order to compress the gas.

Accumulated heat-exchange liquid 350 that is evacuated from the lower chamber 315 may be returned to the pipe 325 through a hydraulic circuit (not shown) that may contain a heat exchanger or other mechanism (not shown) for raising or lowering the temperature of the liquid in the circuit.

A check valve 355 is preferably located at or near the end of the center-drilled channel 330 connecting to the spray head 340. The check valve 355 permits fluid flow with little resistance in the direction indicated by the arrow 360, and at least substantially prevents fluid flow in the opposite direction. Any gas that may enter the orifices of the spray head 340 is substantially prevented by the check valve 355 from entering the center-drilled channel 330, the pipe 325, or any other hydraulic components (not shown) of system 300 (thus preventing such gas from becoming dead space). Check valve 355 may be, e.g., a spring-operated poppet-type check valve or other similar mechanism.

In other embodiments of the invention, a check valve 355 may additionally or instead be located at each orifice of the spray head 340 to prevent gas from entering the spray head 340. In various embodiments, the cracking pressure of the check valve is such that the weight of the water column in the rod is barely insufficient to open the check valve, preventing undesired leakage of the water from the rod.

The system 300 shown in FIG. 3 may be outfitted with an external gas heat exchanger instead of or in addition to liquid sprays. An external gas heat exchanger may also allow expedited heat transfer to or from the high-pressure gas being expanded (or compressed) in the cylinder 305. Such methods and systems for isothermal gas expansion (or compression) using an external heat exchanger are shown and described in the '426 patent.

In other embodiments of the invention, not shown in FIG. 3, a spray head may be mounted on the upper surface of chamber 320. This spray head may be alternative or additional to the spray head 340 shown in FIG. 3. A check valve may be installed where liquid enters this spray head, and/or check valves may be installed at each orifice of this spray head. In still other embodiments of the invention, not shown in FIG. 3, spray-injection orifices may be disposed in a spray rod located parallel to the main axis of the cylinder 305, and gas may be prevented from entering the spray rod by a check valve installed at each orifice of the spray rod; alternatively or in addition, gas may be prevented from moving upstream from the spray rod into other hydraulic components by a check valve located at the liquid intake end of the rod. All dispositions of spray-injecting orifices within the cylinder 305 and all dispositions of check valves at or near spray-injecting orifices to prevent movement of gas from the interior of the expander-compressor cylinder into the hydraulic portions of the system are contemplated and within the scope of the invention. Furthermore, embodiments of the invention may be implemented in systems employing two or more pneumatic or pneumatic-hydraulic cylinders, single-acting or double-acting, connected in series or otherwise.

Figure 4:
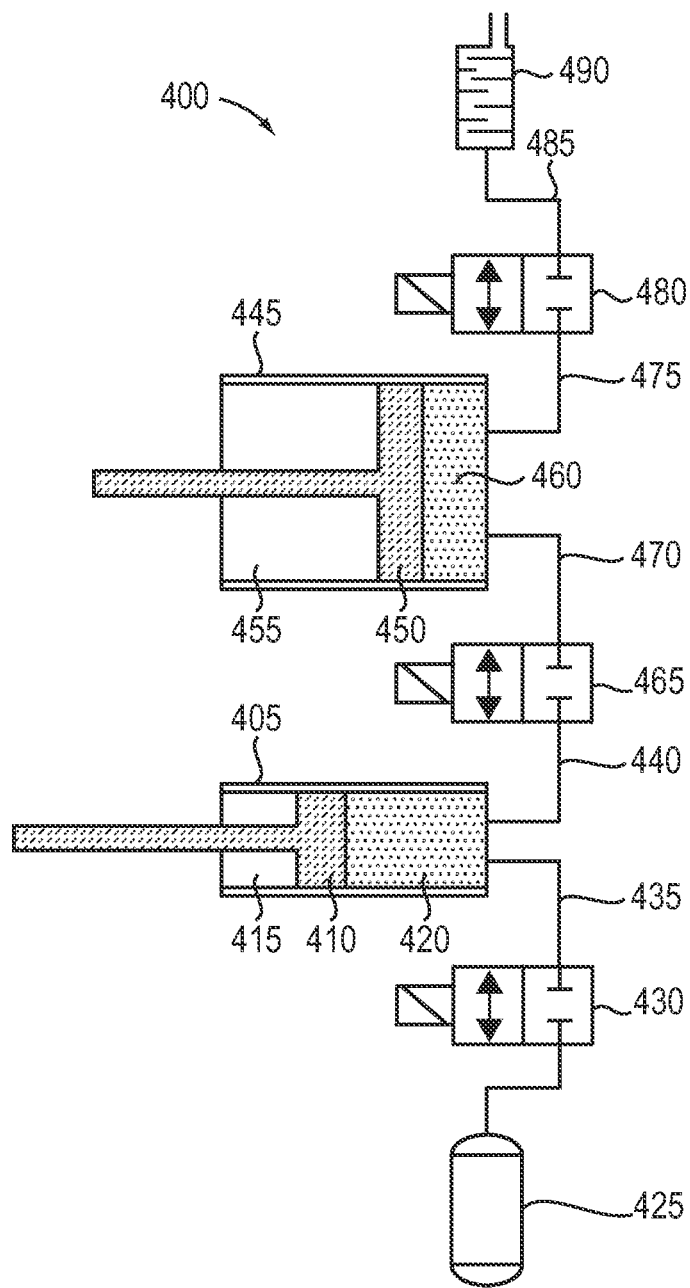
FIG. 4 is a schematic drawing of a group of two pneumatic expander-compressor cylinders not employing an embodiment of the invention.

In accordance with various embodiments of the invention, dead space in pneumatic components may be minimized or eliminated via the use of a separate reservoir containing gas at an appropriate pressure. As an illustration of a system lacking such a reservoir (and thus having deleterious dead space), FIG. 4 depicts an exemplary system 400 that compresses or expands gas using a group of two series-connected expander-compressor cylinders and that does not employ various embodiments of the invention. System 400 includes a high-pressure cylinder 405 containing a mobile piston 410 that divides the interior of the cylinder 405 into two chambers 415 and 420. A port or ports (not shown) with associated pipes and valves (not shown) allows for fluid to be admitted to or withdrawn from chamber 415 as desired. Gas is stored at high pressure in a reservoir 425 and may be admitted to chamber 420 through a bidirectional valve 430, piping 435, and an appropriate port (not shown). Gas may be exhausted through chamber 420 through piping 440 and an appropriate port (not shown).

System 400 also includes a low-pressure cylinder 445 containing a mobile piston 450 that divides the interior of the cylinder 445 into two chambers 455 and 460. A port or ports (not shown) with associated pipes and valves (not shown) allows fluid to be admitted to or exhausted from chamber 455 as desired. Gas may be passed from chamber 420 of cylinder 405 to chamber 460 of cylinder 445 through piping 440, a bidirectional valve 465, and piping 470. Gas may be passed from or admitted to chamber 460 through piping 475, a bidirectional valve 480, piping 485, and a vent 490.

In other embodiments, any or all of the bidirectional valves 430, 465, and 480 may be replaced by two one-directional valves in parallel, such as an actuated one-directional valve for expansion and a non-actuated check valve for compression, or by some other mechanism.

During air expansion, valve 430 is opened and a quantity of high-pressure gas from reservoir 425 is admitted into chamber 420. The gas in chamber 420 expands, performing work on piston 410. At some point during the expansion of the gas in chamber 420, valve 430 is closed. When the piston 410 has reached its limit of motion, the pressure of the gas in chamber 420 has decreased from its original high value (e.g., approximately 3,000 psig) to a mid-pressure (e.g., approximately 250 psig).

While expanding gas in chamber 420 is moving piston 410 so as to enlarge chamber 420, piston 450 in cylinder 445 is moved so as to shrink chamber 460. During this motion, valve 480 is open and gas is exhausted at low pressure from chamber 460 through piping 475, valve 480, piping 485, and vent 490. When chamber 460 is at minimum volume and low pressure, valve 480 is closed. Valve 465 is then opened, allowing mid-pressure gas to exit chamber 420 through pipe 440. The volumes within chamber 460, piping 470, and portions of valve 465 are at low pressure and therefore constitute dead space: mid-pressure gas from chamber 420 expands partially into this volume, losing some of its elastic potential energy. A coupling loss is thus typically incurred as gas is transferred from chamber 420 to chamber 460. Piping 470 (and therefore any dead space within piping 470) may be substantially eliminated by locating valve 465 at the exterior opening of the port (not depicted) in chamber 460 through which mid-pressure air is admitted.

When fluid communication has been established between chambers 420 and 460 by opening valve 465, piston 410 in cylinder 405 may be moved so as to reduce the volume of chamber 420 while gas at mid-pressure moves to chamber 460 and there expands, performing work on piston 450. When piston 450 has reached its limit of motion, the gas in chamber 460 will generally be at low pressure.

Figure 5:
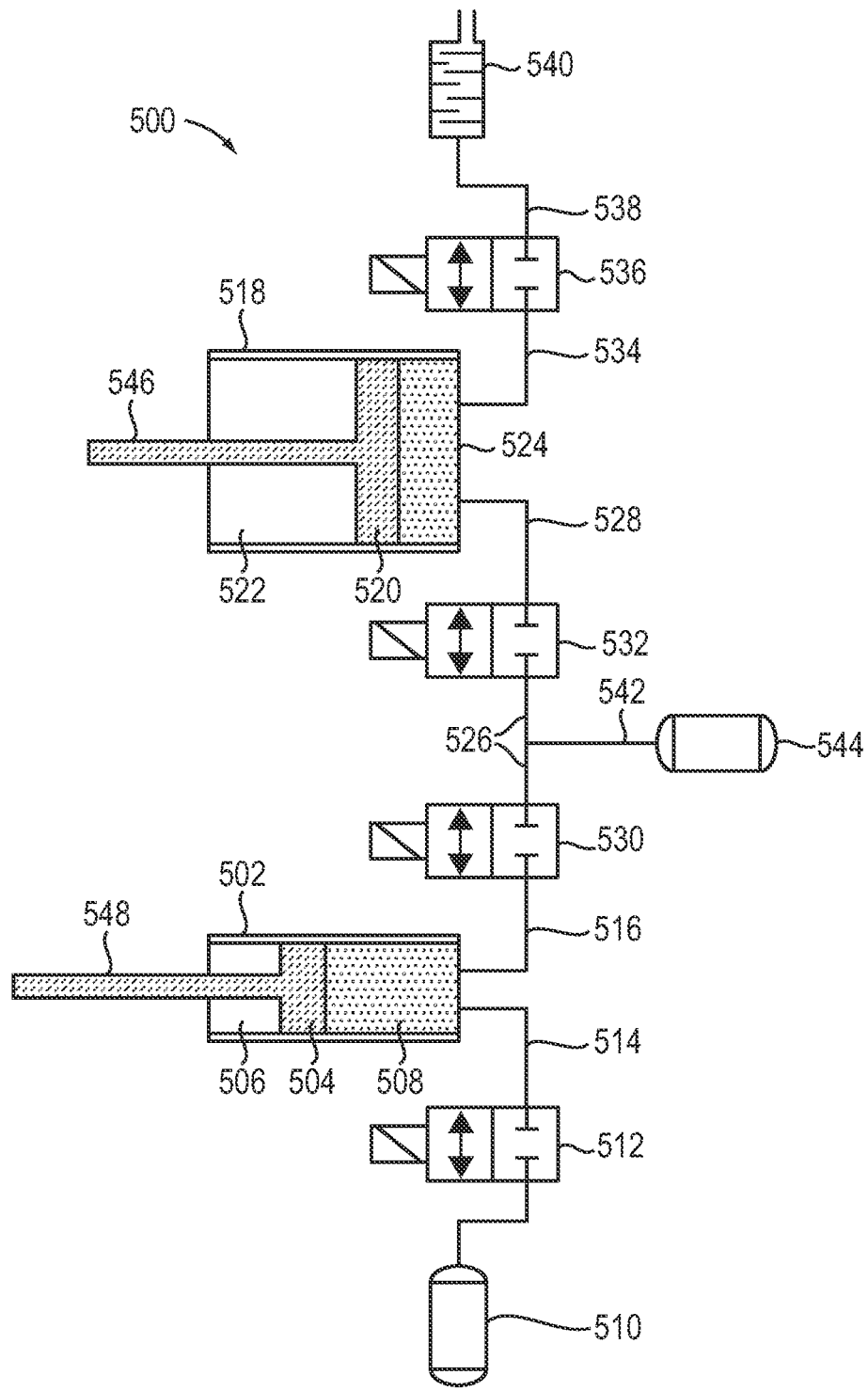
FIG. 5 is a schematic drawing of a group of two pneumatic expander-compressor cylinders employing an exemplary embodiment of the invention.

FIG. 5 depicts an illustrative system 500 that compresses or expands gas using a group of two series-connected expander-compressor cylinders in accordance with embodiments of the invention. System 500 includes a high-pressure cylinder 502 containing a mobile piston 504 that divides the interior of the cylinder 502 into two chambers 506 and 508. A port or ports (not shown) with associated pipes and valves (not shown) allows fluid to be admitted to or withdrawn from chamber 506 as desired. Gas is stored at high pressure in a reservoir 510 and may be admitted to chamber 508 through a bidirectional valve 512, piping 514, and an appropriate port (not shown). Gas may be exhausted from chamber 508 through piping 516 and an appropriate port (not shown).

System 500 also includes a low-pressure cylinder 518 containing a mobile piston 520 that divides the interior of the cylinder 518 into two chambers 522 and 524. A port or ports (not shown) with associated pipes and valves (not shown) allows fluid to be admitted to or exhausted from chamber 522 as desired. Gas may be passed from chamber 508 of cylinder 502 to chamber 524 of cylinder 518 through piping 516, 526, 528 and bidirectional valves 530 and 532. Gas may be passed from or admitted to chamber 524 through piping 534, a bidirectional valve 536, piping 538, and a vent 540. Piping 528 (and therefore any dead space within piping 528) may be essentially eliminated by locating valve 532 at the exterior opening of the port (not depicted) in chamber 524 through which mid-pressure air is admitted.

In other embodiments, any or all of the bidirectional valves 512, 530, 532, and 536 may be replaced by two one-directional valves in parallel or by some other mechanism.

Piping 526 between valves 530 and 532 is in communication via piping 542 with a substantial reservoir 544 of gas that is approximately at the mid-pressure. Gas in piping 526, because it is generally always in communication with the reservoir 544, is always at approximately the mid-pressure. The reservoir 544 is large enough so that a volume of mid-pressure gas approximately equal to that within the valves, piping, chambers, and other components with which the reservoir 544 is in fluid communication may enter or leave the reservoir 544 without substantially changing the pressure within reservoir 544. For example, the volume of reservoir 544 may be at least ten times, or even at least 50-100 times the approximate volume of these components (and/or other components from which dead space is meant to be eliminated). As used herein, "maintaining a substantially constant pressure within the reservoir" typically refers to maintaining the pressure within the reservoir to within ±10% of its nominal value, within ±5% of its nominal value, or even within ±2% of its nominal value.

During air expansion, valve 512 is opened and a quantity of high-pressure gas from reservoir 510 is admitted into chamber 508. The gas in chamber 508 expands, performing work on piston 504. At some point during the expansion of the gas in chamber 508, valve 512 is closed. When the piston 504 has reached its limit of motion, the pressure of the gas in chamber 508 has decreased from its original high value (e.g., approximately 3,000 psig) to a mid-pressure (e.g., approximately 250 psig).

Valve 530 is then opened, allowing gas at mid-pressure to flow from chamber 508 to pipe 526 and pipe 542 and reservoir 544, which is at or near the mid-pressure. In this state of operation, there is approximately zero coupling loss due to dead space between chamber 508 and chamber 524 because the reservoir 544 and pipes 526 and 542 are at the same pressure as chamber 508. Because the reservoir 544 effectively eliminates dead space between chamber 508 and chamber 524, the cylinders 502 and 518 may be located at any distance from each other without substantial loss of efficiency due to dead space in piping connecting the cylinders 502 and 518.

In one illustrative example, pistons 504 and 520 are 180° out of phase, such that while expanding gas in chamber 508 is moving piston 504 so as to enlarge chamber 508, piston 520 in cylinder 518 is moved so as to shrink chamber 524. When chamber 508 is at maximum volume and approximately mid-pressure, chamber 524 is at minimum volume and low pressure and valve 536 is closed.

When chamber 524 is at minimum volume, valve 532 is then opened, allowing gas at mid-pressure to flow from reservoir 544 (and chamber 508 when valve 530 is also open) to chamber 524. In this state of operation, valve 532 is preferably located in close proximity to chamber 524 such that minimal or no dead volume exists therebetween.

When fluid communication has been established between reservoir 544 and chamber 508 by opening valve 530, piston 504 in cylinder 502 may be moved so as to reduce the volume of chamber 508 while gas at mid-pressure expands in chamber 524, thus increasing the volume of chamber 524 and performing work on piston 520. Valve 530 typically remains open for substantially the full stroke of piston 504, thus transferring substantially all mid-pressure gas from chamber 508 to reservoir 544 and/or chamber 524.

A quantity of mid-pressure gas from reservoir 544 is admitted into chamber 524. The gas in chamber 524 expands, performing work on piston 520. At some point during the expansion of the gas in chamber 524, valve 532 is closed. When the piston 520 has reached its limit of motion, the pressure of the gas in chamber 524 has decreased from its original mid-pressure value (e.g., approximately 250 psig) to a lower value (e.g., approximately 1 psig, herein termed "low pressure"), and valve 536 may be opened to allow the gas in chamber 524 to be exhausted through vent 540.

In alternative modes of operation, valves 530 and 532 need not be opened simultaneously. If reservoir 544 is sufficiently large, chamber 524 may be filled with gas at mid-pressure from reservoir 544 at any time relative to the valve timing of valve 530 and connection of chamber 508 to reservoir 544. Cylinder 518 may therefore perform its expansion stroke at any time after reservoir 544 has been fully charged with gas at approximately mid-pressure. In these alternative modes of operation, the phases of cylinders 502 and 518 are independent. The rods 546, 548 may, for example, be connected to a crankshaft whose throws are set at any arbitrary desired angles rather than 180° apart. For example, the phase relationship between the cylinders may be substantially different from 180°, i.e., at angles different from 180° by at least approximately 2°, at least approximately 5°, or even at least approximately 10°. In embodiments where the cylinder group includes three or more shafts, the shafts of the cylinders may similarly be connected to a crankshaft whose throws are set at any arbitrary desired angles (e.g., angles other than 120° apart).

Reservoir 544 may include integrated heat exchange in order to facilitate substantially isothermal compression and/or expansion of gas within system 500. As described in the '703 application and U.S. patent application Ser. No. 12/690,513 (the '513 application), the entire disclosure of which is incorporated by reference herein, pressure vessels such as reservoir 544 may be fluidly connected to a heat-transfer subsystem. The heat-transfer subsystem may include, e.g., a circulation apparatus for circulating heat-transfer fluid between reservoir 544 and a heat exchanger, and may also include a mechanism (e.g., a spray head and/or a spray rod) disposed in reservoir 544 for introducing the heat-transfer fluid.

In other embodiments, groups of three or more cylinders may be operated in a manner similar to that described above for system 500 in FIG. 5. Between each cylinder and its neighbor in the group, a reservoir may be employed to maintain an approximately constant mid-pressure (i.e., a pressure shared between the pressure ranges of operation of the cylinders), thus eliminating dead volume and permitting arbitrary location and phasing of the cylinders in the group.

In one embodiment, the reservoir 544 is maintained at near-constant pressure by employing a pressure-compensated vessel, such as a cylinder separated internally into two chambers by a piston slidably disposed therein with a particular mass attached to the piston. The mass may be chosen so as to maintain the chamber of the cylinder at the desired pressure (e.g., if the desired pressure is 250 prig for a piston with area 10 in$^2$, then the mass and piston would have a weight of 2,500 lbs). In other embodiments, the pressure of reservoir 544 may be allowed to vary over a given pressure range (e.g., a pressure range centered around the desired mid-pressure and varying by no more than, for example, ±10%).

Figure 6:
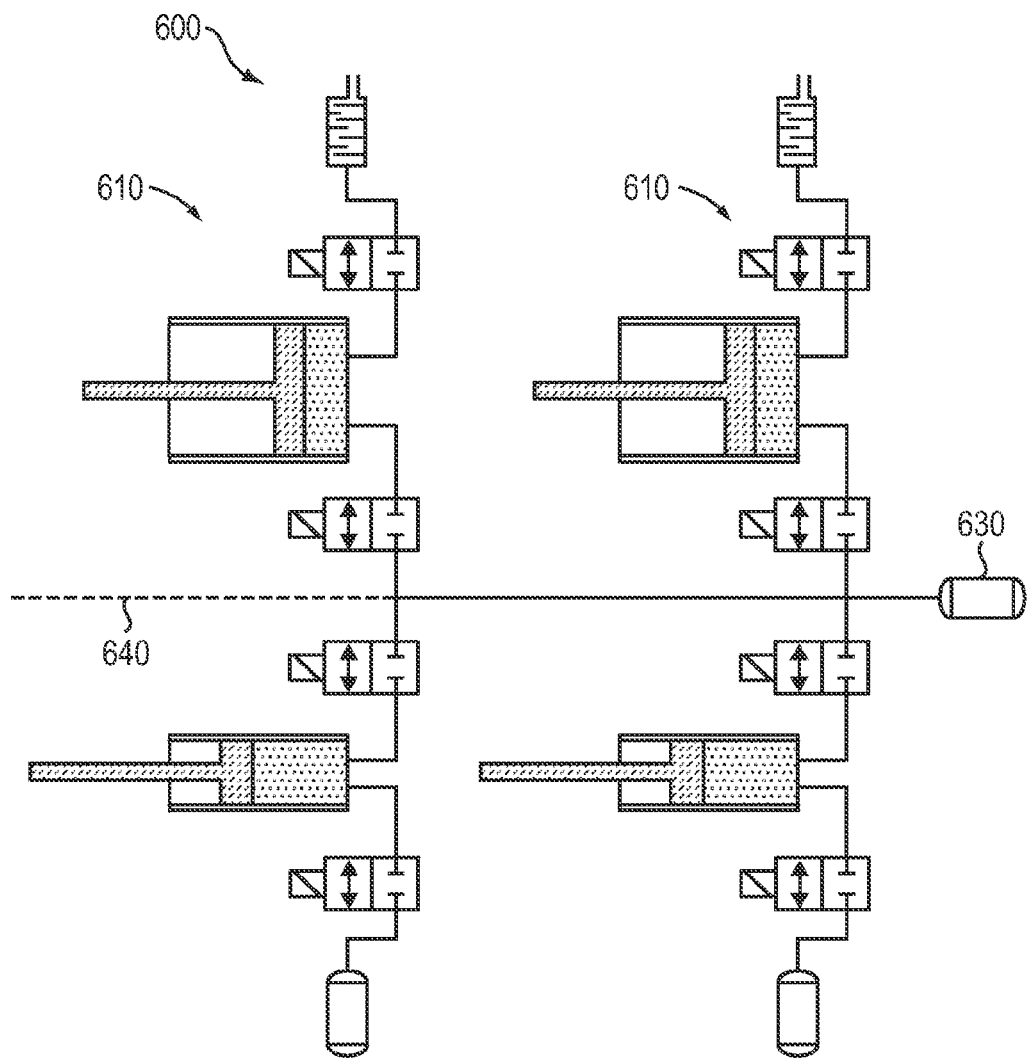
FIG. 6 is a schematic drawing of two groups of pneumatic expander-compressor cylinders employing an exemplary embodiment of the invention.

FIG. 6 is a schematic portrayal of an energy storage and recovery system 600 that features two groups of cylinders 610, 620 that are similar to the group portrayed in FIG. 5 and operated in parallel. A single reservoir 630 may be employed to maintain mid-pressure in the connective components of both cylinder groups in the manner already described in FIG. 5 for a single cylinder group. Additional similar groups of cylinders (not shown) may be serviced by the reservoir 630, as indicated by dotted line 640. In other embodiments (not shown), groups containing three or more cylinders are similarly operated in parallel: a single reservoir may be employed for each mid-pressure occurring in the system of cylinder groups; each reservoir may be connected to the components in each group of cylinders where dead space would otherwise occur.

Generally, the systems described herein may be operated in both an expansion mode and in the reverse compression mode as part of a full-cycle energy-storage system with high efficiency. For example, the systems may be operated as both compressor and expander, storing electricity in the form of the potential energy of compressed gas and producing electricity from the potential energy of compressed gas. Alternatively, the systems may be operated independently as compressors or expanders.

In addition, the systems described above, and/or other embodiments employing liquid-spray heat exchange or external gas heat exchange (as detailed above), may draw or deliver thermal energy via their heat-exchange mechanisms to external systems (not shown) for purposes of cogeneration, as described in the '513 application.

The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A method of energy storage and recovery, the method comprising:
   at least one of:
      (i) compressing gas to store energy within a plurality of cylinder assemblies each operating over a different pressure range, or
      (ii) expanding gas to recover energy within a plurality of cylinder assemblies each operating over a different pressure range; and
   maintaining a connection between at least two cylinder assemblies at an intermediate pressure within the pressure ranges of the at least two cylinder assemblies to reduce dead space within the connection.

2. The method of claim 1, wherein maintaining the connection at a substantially constant pressure comprises supplying gas at the intermediate pressure to the connection.

3. The method of claim 2, wherein the gas is supplied from a reservoir fluidly connected to the connection.

4. The method of claim 3, wherein the reservoir has a volume sufficient to supply gas to an entire volume of the connection while maintaining a substantially constant pressure within the reservoir.

5. The method of claim 3, wherein the reservoir comprises a pressure-compensated vessel.

6. The method of claim 3, further comprising exchanging heat with gas within the reservoir.

7. The method of claim 6, wherein heat is exchanged between the gas within the reservoir and a heat-exchange liquid.

8. The method of claim 7, further comprising circulating the heat-exchange liquid between the reservoir and an external heat exchanger.

9. The method of claim 7, wherein exchanging heat with the gas comprises spraying heat-exchange liquid into the gas within the reservoir.

10. The method of claim 1, wherein the cylinder assemblies expand or compress gas simultaneously and in a phase relationship substantially different from 360° divided by the number of cylinder assemblies.

11. The method of claim 1, wherein the cylinder assemblies expand or compress gas in alternation, gas being supplied to or from a reservoir during expansion or compression in each cylinder assembly.

12. The method of claim 1, wherein gas is expanded, and further comprising venting expanded gas to atmosphere thereafter.

13. The method of claim 1, wherein gas is compressed, and further comprising storing compressed gas in a compressed-gas reservoir thereafter.

14. The method of claim 1, wherein the at least one of compressing gas or expanding gas comprises:
   within a first cylinder assembly and over a first pressure range, at least one of (i) compressing gas to store energy or (ii) expanding gas to recover energy;
   thereafter, transferring gas from the first cylinder assembly to a second cylinder assembly via the connection; and
   within the second cylinder assembly and over a second pressure range different from the first pressure range and overlapping the first pressure range at the intermediate pressure, at least one of (i) compressing gas to store energy or (ii) expanding gas to recover energy.

15. The method of claim 1, further comprising converting a reciprocal motion resulting from the at least one of compressing gas or expanding as into rotary motion.

16. The method of claim 15, wherein the reciprocal motion is converted into rotary motion via at least one crankshaft.

17. The method of claim 1, wherein the plurality of cylinder assemblies are connected in series pneumatically.

18. The method of claim 1, wherein the pressure of the connection is maintained at a substantially constant level.

19. The method of claim 1, further comprising exchanging heat with the gas during the at least one of expanding or compressing.

20. The method of claim 19, wherein exchanging heat with the gas maintains the gas at a substantially constant temperature during the at least one of expanding or compressing.

21. The method of claim 19, wherein exchanging heat with the gas comprises spraying heat-exchange liquid into the gas.

22. The method of claim 19, wherein heat is exchanged between the gas and a heat-exchange liquid.

23. The method of claim 22, further comprising circulating the heat-exchange liquid between at least one cylinder assembly and an external heat exchanger.

* * * * *